United States Patent
Chen et al.

(10) Patent No.: US 12,081,750 B2
(45) Date of Patent: Sep. 3, 2024

(54) CODING AND DECODING METHOD AND APPARATUS AND DEVICES THEREFOR

(71) Applicant: HANGZHOU HIKVISION DIGITAL TECHNOLOGY CO., LTD., Hangzhou (CN)

(72) Inventors: Fangdong Chen, Hangzhou (CN); Xiaoqiang Cao, Hangzhou (CN); Yucheng Sun, Hangzhou (CN)

(73) Assignee: Hangzhou Hikvision Digital Technology Co., Ltd., Hangzhou (CN)

( * ) Notice: Subject to any disclaimer, the term of this patent is extended or adjusted under 35 U.S.C. 154(b) by 0 days.

(21) Appl. No.: 18/264,036

(22) PCT Filed: Feb. 22, 2022

(86) PCT No.: PCT/CN2022/077298
§ 371 (c)(1),
(2) Date: Aug. 2, 2023

(87) PCT Pub. No.: WO2022/179504
PCT Pub. Date: Sep. 1, 2022

(65) Prior Publication Data
US 2024/0048695 A1    Feb. 8, 2024

(30) Foreign Application Priority Data
Feb. 23, 2021 (CN) .......................... 202110204154.2

(51) Int. Cl.
*H04N 19/86* (2014.01)
*H04N 19/117* (2014.01)
(Continued)

(52) U.S. Cl.
CPC ......... *H04N 19/117* (2014.11); *H04N 19/157* (2014.11); *H04N 19/182* (2014.11);
(Continued)

(58) Field of Classification Search
CPC .............................. H04N 19/82; H04N 19/86
See application file for complete search history.

(56) References Cited

U.S. PATENT DOCUMENTS

| 9,681,132 B2 * | 6/2017 | Chen ........................ H04N 19/82 |
| 11,272,203 B2 * | 3/2022 | Li ............................ H04N 19/573 |

(Continued)

FOREIGN PATENT DOCUMENTS

| CN | 105453565 | 3/2016 |
| CN | 106105201 | 11/2016 |

(Continued)

OTHER PUBLICATIONS

Adaptive Deblocking filter; List—2003 (Year: 2003).*
(Continued)

*Primary Examiner* — Luis Perez-Fuentes
(74) *Attorney, Agent, or Firm* — Fish & Richardson P.C.

(57) ABSTRACT

Method, apparatus, and devices for encoding and decoding are provided. In one aspect, a method includes: if a current pixel point in a current block satisfies an enable condition of an enhanced refinement mode, determining a gradient value of the current pixel point based on an original pixel value of the current pixel point and an original pixel value of a surrounding pixel point of the current pixel point; based on the gradient value of the current pixel point and the original pixel value of the current pixel point, determining a refined pixel value of the current pixel point.

19 Claims, 3 Drawing Sheets

---

If a current pixel point in a current block satisfies an enable condition of an enhanced refinement mode, determine a gradient value of the current pixel point based on an original pixel value of the current pixel point and an original pixel value of a surrounding pixel point of the current pixel point — 401

Determine a refined pixel value of the current pixel point based on the gradient value of the current pixel point and the original pixel value of the current pixel point — 402

(51) Int. Cl.
  *H04N 19/157* (2014.01)
  *H04N 19/182* (2014.01)
  *H04N 19/186* (2014.01)
  *H04N 19/70* (2014.01)

(52) U.S. Cl.
  CPC .......... *H04N 19/186* (2014.11); *H04N 19/70* (2014.11); *H04N 19/86* (2014.11)

(56) References Cited

U.S. PATENT DOCUMENTS

| | | | |
|---|---|---|---|
| 11,310,519 B2* | 4/2022 | Ray | H04N 19/139 |
| 2006/0110062 A1 | 5/2006 | Chiang et al. | |
| 2012/0328029 A1 | 12/2012 | Sadafale | |
| 2013/0243104 A1 | 9/2013 | Chen et al. | |
| 2015/0264406 A1 | 9/2015 | Kim et al. | |
| 2016/0088295 A1 | 3/2016 | Yoshino et al. | |
| 2018/0332309 A1 | 11/2018 | Jin et al. | |

FOREIGN PATENT DOCUMENTS

| | | |
|---|---|---|
| CN | 108293117 | 7/2018 |
| CN | 109889853 | 6/2019 |
| CN | 111031317 | 4/2020 |
| CN | 111213378 | 5/2020 |
| CN | 111669584 | 9/2020 |
| CN | 112154666 | 12/2020 |
| CN | 113766224 | 12/2021 |
| CN | 113891075 | 1/2022 |
| CN | 114125445 | 3/2022 |
| CN | 114189683 | 3/2022 |
| CN | 114640845 | 6/2022 |
| JP | 2014239338 | 12/2014 |
| JP | 2015-104061 | 6/2015 |
| JP | 2017513326 | 5/2017 |
| WO | WO 2014196613 | 12/2014 |
| WO | WO 2017091001 | 6/2017 |

OTHER PUBLICATIONS

Block based adaptive loop filter;—2008 (Year: 2008).*
Coding unit synch picture quadtree-based adaptive loop filter; Tsai—2010 (Year: 2010).*
International Search Report in International Appln. No. PCT/CN2022/077298, dated May 18, 2022, 4 pages (with English translation).
Office Action in Chinese Appln. No. 202110204154.2, dated Oct. 27, 2022, 14 pages (with English translation).
Office Action in Chinese Appln. No. 202111625855.X, dated Oct. 18, 2022, 12 pages (with English translation).
Notice of Allowance in Chinese Appln. No. 202110204154.2, dated Jan. 10, 2023, 7 pages (with English translation).
Apple Inc., "SAO extension for higher bit-depth coding," JCTVC-N0201, Joint Collaborative Team on Video Coding (JCT-VC) of ITU-T SG 16 WP 3 and ISO/IEC JTC 1/SC 29/WG 11, 14th Meeting: Vienna, AT, July 25-Aug. 2, 2013, 6 pages.
Extended European Search Report in European Appln. No. 22758868.8, mailed on May 31, 2024, 12 pages.
Fu et al., "Sample Adaptive Offset in the HEVC Standard," IEEE Transactions on Circuits and Systems for Video Technology, Dec. 2012, 22(12): 1755-1764.
Jang et al., "Rate-Distortion Aware Skip Control for Sample Adaptive Offset," 2015 International SoC Design Conference (ISOCC), IEEE, Nov. 2, 2015, pp. 289-290.
Notice of Allowance in Korean Appln. No. 10-2023-7027399, mailed on May 30, 2024, 5 pages (with English translation).
Office Action in Japanese Appln. No. 2023-551246, mailed on Mar. 25, 2024, 6 pages (with English translation).

* cited by examiner

CODING AND DECODING METHOD AND APPARATUS AND DEVICES THEREFOR

CROSS-REFERENCE TO RELATED APPLICATIONS

This application is a national stage of International Application No. PCT/CN2022/077298, filed on Feb. 22, 2022, which claims priority to Chinese Patent Application No. 202110204154.2, filed on Feb. 23, 2021. Both of the aforementioned applications are hereby incorporated by reference in their entireties.

TECHNICAL FIELD

The present disclosure relates to the field of encoding and decoding technologies, and in particular to an encoding and decoding method and apparatus and devices thereof.

BACKGROUND

To save spaces, video pictures are always transmitted after being encoded. A complete video encoding method may include processes such as prediction, transformation, quantization, entropy encoding, filtering, etc., where, the prediction encoding may include intra encoding and inter encoding. Further, the inter encoding refers to an operation of utilizing a temporal-domain correlation of a video to predict pixel values of a current picture by using pixel values of neighboring encoded pictures, so as to effectively remove temporal-domain redundancy of the video. Intra encoding refers to an operation of utilizing a spatial-domain correlation of a video to predict a value of a current pixel by using pixel values of one or more encoded blocks of a current picture, so as to remove spatial-domain redundancy of the video.

The common filtering technologies include deblocking filter (DBF) technology, Sample Adaptive Offset (SAO) technology, and Adaptive Loop Filter (ALF) technology. The DBF technology is used to remove the block boundary effect generated by blocking encoding. The SAO technology is to perform classification based on pixel values of samples and gradient values of surrounding blocks and add a different compensation value for each class of pixel values to enable a reconstructed picture to be closer to an original picture. The ALF technology is used to filter a reconstructed picture by using a Wiener filter to enable the reconstructed picture to be closer to an original picture.

But, the filtering technologies such as DBF, SAO and ALF all perform classification based on the pixel value of the current pixel point or based on a relationship between the pixel value of the current pixel point and a pixel value of a surrounding pixel point, and then perform different filtering operations based on different classes. In this case, there may be overfiltering phenomenon, namely, the filtered pixel values are far greater than or far less than the unfiltered pixel values, and far greater than or far less than the original pixel values. Thus, there are problems such as poor filtering effect and poor encoding performance.

SUMMARY

In the present disclosure, an encoding and decoding method and apparatus, and devices thereof are provided, so as to improve encoding performance.

In the present disclosure, an encoding and decoding method is provided. The method includes:

if a current pixel point in a current block satisfies an enable condition of an enhanced refinement mode, determining a gradient value of the current pixel point based on an original pixel value of the current pixel point and an original pixel value of a surrounding pixel point of the current pixel point; based on the gradient value of the current pixel point and the original pixel value of the current pixel point, determining a refined pixel value of the current pixel point.

In the present disclosure, a decoding apparatus is provided. The apparatus includes:
a memory, configured to store video data;
a decoder, configured to:
if a current pixel point in a current block satisfies an enable condition of an enhanced refinement mode, determine a gradient value of the current pixel point based on an original pixel value of the current pixel point and an original pixel value of a surrounding pixel point of the current pixel point; based on the gradient value of the current pixel point and the original pixel value of the current pixel point, determine a refined pixel value of the current pixel point.

In the present disclosure, an encoding apparatus is provided. The apparatus includes:
a memory, configured to store video data;
an encoder, configured to:
if a current pixel point in a current block satisfies an enable condition of an enhanced refinement mode, determine a gradient value of the current pixel point based on an original pixel value of the current pixel point and an original pixel value of a surrounding pixel point of the current pixel point; based on the gradient value of the current pixel point and the original pixel value of the current pixel point, determine a refined pixel value of the current pixel point.

In the present disclosure, a decoder device is provided. The device includes: a processor and a machine-readable storage medium, where the machine-readable storage medium stores machine-executable instructions executable by the processor;
the processor is configured to execute the machine-executable instructions to perform the steps of:
if a current pixel point in a current block satisfies an enable condition of an enhanced refinement mode, determining a gradient value of the current pixel point based on an original pixel value of the current pixel point and an original pixel value of a surrounding pixel point of the current pixel point; based on the gradient value of the current pixel point and the original pixel value of the current pixel point, determining a refined pixel value of the current pixel point.

In the present disclosure an encoder device is provided. The device includes a processor and a machine-readable storage medium, where the machine-readable storage medium stores machine-executable instructions executable by the processor;
the processor is configured to execute the machine-executable instructions to perform the steps of:
if a current pixel point in a current block satisfies an enable condition of an enhanced refinement mode, determining a gradient value of the current pixel point based on an original pixel value of the current pixel point and an original pixel value of a surrounding pixel point of the current pixel point; based on the gradient value of the current pixel point and the original pixel value of the current pixel point, determining a refined pixel value of the current pixel point.

It can be seen from the above technical solutions that, in the embodiments of the present disclosure, if a current pixel point in a current block satisfies an enable condition of an enhanced refinement mode, an refined pixel value of the current pixel point may be determined based on a gradient value of the current pixel point and an original pixel value of the current pixel point, namely, refinement is performed on the original pixel value of the current pixel point based on the gradient value of the current pixel point to enable the refined pixel value of the current pixel point to be closer to the original pixel, thus improving the encoding performance. In filtering processes such as DBF, SAO and ALF, if a current pixel point in a current block satisfies an enable condition of an enhanced refinement mode, refinement may be performed on an original pixel value of the current pixel point based on a gradient value of the current pixel point to improve the filtering effect and the encoding performance.

DETAILED DESCRIPTION

The terms used in the embodiments of the present disclosure are only for describing specific embodiments, rather than limiting the embodiments of the present disclosure. The singular forms of "a", "said" and "the" used in the present disclosure and claims are also intended to include plural forms, unless the context clearly indicates otherwise. It should also be understood that the term "and/or" as used herein refers to any one or all possible combinations of one or more associated listed items. It should be understood that although the terms such as first, second, third, etc. may be used in the embodiments of the present disclosure to describe various information, the information should not be limited to these terms. These terms are only used to distinguish the same type of information from each other. For example, without departing from the scope of the embodiments of the present disclosure, first information can also be referred to as second information, and similarly, second information can also be referred to as first information, thus, the selection of the terms depends on the context. In addition, the word "if" used can be interpreted as "upon" or "when" or "in response to".

In order to enable those skilled in the arts to better understand the technical solutions of the present disclosure, the technical terms are briefly introduced below.

Figure 1:
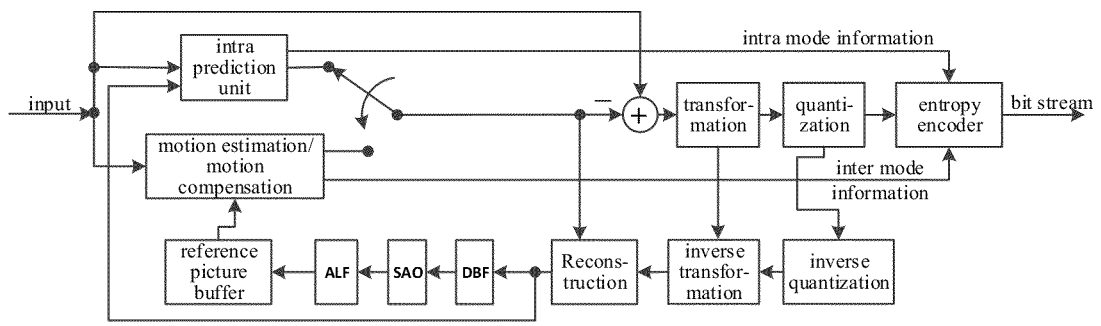
FIG. 1 is a schematic diagram illustrating an encoding and decoding frame according to an embodiment of the present disclosure.

Video encoding framework: with reference to FIG. 1, the video encoding framework may be used to implement the encoder processing flow in the embodiments of the present disclosure. The schematic diagram of the video decoding framework may be similar to FIG. 1 and thus will not be repeated herein. The video decoding framework may be used to implement the decoder processing flow in the embodiments of the present disclosure. The video encoding framework and the video decoding framework may include but not limited to: a prediction module (e.g. an intra prediction module and an inter prediction module and the like), a motion estimation/motion compensation module, a reference picture buffer, an in-loop filtering module, a reconstruction module, a transform module, a quantization module, an inverse transform module, an inverse quantization module, an entropy encoder, and so on. At the encoder, through the cooperation of these modules, the processing flow of the encoder can be achieved; at the decoder, through the cooperation of these modules, the processing flow of the decoder can be achieved.

Loop filter is used to reduce the problems such as picture block effect or a poor picture effect, so as to improve picture quality. The loop filter may include: three filters, i.e. DBF, SAO and ALF. The DBF is a deblocking filter and used to remove the block boundary effect generated by the blocking encoding. The SAO is a sample adaptive offset filter and used to perform classification based on pixel values of samples and the gradient values of the surrounding blocks and add a different compensation value for each class of pixel values to enable a reconstructed picture to be closer to an original picture. The ALF is an adaptive loop filter and used to filter a reconstructed picture by using a Wiener filter to enable the reconstructed picture to be closer to an original picture.

In some embodiments, in a video encoding process and a video decoding process, the prediction process may include an intra prediction and an inter prediction. In the intra prediction, due to a strong spatial-domain correlation between neighboring blocks, surrounding reconstructed pixels are used as reference pixels to predict a current uncoded block. Thus, only residual values need to be further encoded, without encoding original values, thereby effectively removing the spatial-domain redundancy and greatly increasing the compression efficiency. The inter prediction refers to an operation of utilizing a temporal-domain correlation of a video to predict pixel values of a current picture by using pixel values of neighboring encoded pictures, to remove the temporal-domain redundancy of the video.

In some embodiments, in a video encoding process and a video decoding process, the transformation refers to transforming a picture described in the form of pixels in a spatial domain into a picture of a transformed domain, which is denoted in the form of transformation coefficient. Since most pictures contain many flat regions and slowly-changing regions, decentralized distribution of picture energy in a spatial domain is transformed into centralized distribution in a transformed domain in a proper transformation process, so as to remove frequency-domain correlation between signals and effectively compress bit stream in cooperation with a quantization process.

In some embodiments, the entropy encoding refers to performing lossless encoding based on the principle of information entropy, which is at the last processing module in a video compression to convert a series of element symbols representing a video sequence into one binary bit stream for transmission or storage. The input symbols may include quantized transform coefficient(s), motion vector information, prediction mode information and transform and quantization-relevant syntaxes and the like. The output data of the entropy encoding module is the final bit stream after compression of the original video. The entropy encoding can effectively remove the statistical redundancy of these video element symbols and is one of important tools for ensuring compression efficiency of video encoding.

In some embodiments, the loop filter is used to reduce the problems such as block effect or poor picture effect of the picture to improve the picture quality. The loop filter may include but not limited to: DBF, SAO and ALF and the like. For example, in a video picture, the boundary of blocks of the picture are not continuous and there is obvious block effect in compression and reconstruction of the picture, severely affecting the picture quality. The DBF technology may be used to perform deblocking filtering on the boundary. Deblocking filtering is performed on the boundaries of all Prediction Units (PU) and Transform Units (TU), where the deblocking filtering includes a filtering decision and a filtering operation. In a filtering decision process, a boundary strength (e.g. no filtering, weak filtering or strong filtering), and a filtering parameter are obtained. In a filtering operation process, correction is performed on a pixel based on the boundary strength and the filtering parameter. For example, when filtering is performed on the boundary, the filtering may be strong or weak filtering, which is performed by using a tap of different length.

The SAO filter is used to remove the ringing effect. The ringing effect refers to a ripple phenomenon generated around the edge after decoding because of quantization distortion of high-frequency alternating current coefficient. The larger the size of the transformed block is, the more obvious the ringing effect is. The basic principle of the SAO is to perform compensation on the crest pixels in a reconstruction curve by adding a negative value and on the trough pixels by adding a positive value. The SAO may, with Coding Tree Unit (CTU) as basic unit, include two major classes of compensation forms: Edge Offset (EO) and Band Offset (BO). Further, a parameter fusion technology is introduced.

The ALF filter is used to obtain an optimal filter in mean square sense, i.e. Wiener filter, based on original signals and distortion signals. The ALF filter may include but not limited to: a 7*7 rhombus filter or a 5*5 rhombus filter, a 7*7 cross plus 3*3 square centrosymmetrical filter, or a 7*7 cross plus 5*5 square centrosymmetrical filter.

The Intra prediction is to utilize a spatial-domain correlation of a video to perform prediction by one or more encoded blocks of a current block, so as to remove spatial-domain redundancy of the video. The intra prediction provides multiple prediction modes, each of which corresponds to one texture direction (except for DC mode). For example, if a picture texture is arranged horizontally, a horizontal prediction mode can predict picture information better.

The inter prediction is to, based on the temporal-domain correlation of a video, by using the pixels of the neighboring encoded pictures, predict a pixel of a current picture because a video sequence contains a strong temporal-domain correlation, so as to effectively remove temporal-domain redundancy of the video. Inter prediction parts in video encoding standards all adopt a block-based motion compensation technology of which the main principle is to find a best matching block in a previously-encoded picture for each pixel block of the current picture, where this process is referred to as Motion Estimation (ME).

Motion Vector (MV), in inter prediction, may be used to represent a relative displacement between a current block of a current picture and a reference block of a reference picture. Each block obtained by partition has a corresponding motion vector to be transmitted to a decoder. If the motion vector of each block is encoded and transmitted independently, for a large number of smaller-sized blocks, lots of bits are consumed. In order to reduce the number of bits used to encode the motion vector, spatial-domain correlation between neighboring blocks can be used to predict the motion vector of the current to-be-encoded block based on the motion vector of the neighboring encoded block, and then a prediction difference is encoded. Thus, the number of bits representing the motion vector can be effectively reduced. Based on this, in the process of encoding the motion vector of the current block, the motion vector of the neighboring encoded block is firstly used to predict the motion vector of the current block, and then a motion vector difference (MVD) between a motion vector prediction (MVP) value and a real estimation value of the motion vector is encoded.

For Motion Information, since the motion vector represents a position deviation of the current block relative to a reference block, in order to accurately obtain the information of the indicated block, in addition to the motion vector, index information of the reference picture is also needed to indicate which reference picture is used for the current block. In video encoding technology, for a current picture, a reference picture list can usually be established, and the index information of the reference picture specifies which reference picture listed in the reference picture list is used for the current block. In addition, many encoding technologies also support multiple reference picture lists, so an index value may also be used to indicate which reference picture list is used, and this index value can be referred to as a reference direction. To sum up, in video encoding technology, information related to motion, such as motion vector, reference picture index information, and reference direction, can be collectively referred to as motion information.

For flag coding, in a video encoding, there are many modes. For a particular block, one of these modes may be adopted. In order to represent which mode is adopted, each block needs to mark the mode by encoding a corresponding flag. For example, for an encoder, a value of the flag is determined by encoder decision, and then the value of the flag is encoded and transmitted to a decoder. For a decoder, by decoding the value of the flag, it is determined whether a corresponding mode is enabled.

In a flag encoding process, the flag encoding may be achieved by a high-level syntax. The high-level syntax may be used to represent whether to allow enabling a mode, namely, enabling a mode is allowed or disallowed by a high-level syntax.

In some embodiments, the high-level syntax may be a high-level syntax of a sequence parameter set, or a high-level syntax of a picture parameter set, or a high-level syntax of a slice header, or a high-level syntax of a picture header, which is not limited herein.

For the high-level syntax of the sequence parameter set (SPS), there is a flag for determining whether to allow some modes (tool/method) to be switched on or off in the entire video sequence (i.e. multiple video pictures). For example, the value of the flag is a value A (for example, the value 1 or the like), the video sequence allows enabling the mode corresponding to the flag; or, if the value of the flag is a value B (for example, the value 0 or the like), the video sequence disallows enabling the mode corresponding the flag.

For the high-level syntax of the picture parameter set (PPS), there is a flag for determining whether to allow some modes (tool/method) to be switched on or off in a picture (e.g. video picture). If the value of the flag is a value A, the video picture allows enabling the mode corresponding to the flag; if the value of the flag is a value B, the video picture disallows enabling the mode corresponding to the flag.

For the high-level syntax of the picture header, there is flag for determining whether to allow some modes (tool/method) to be switched on or off in a picture header. If the value of the flag is a value A, the picture header allows enabling the mode corresponding to the flag; if the value of the flag is a value B, the picture header disallows enabling the mode corresponding to the flag. In some embodiments, the picture header stores common information only for the current picture. For example, when a picture includes a plurality of slices, the plurality of slices may share the information in the picture header.

For the high-level syntax of the slice header, there is a flag for determining whether to allow some modes (tool/method) to be switched on or off in a slice. If the value of the flag is a value A, the slice allows enabling the mode corresponding to the flag; if the value of the flag is a value B, the slice disallows enabling the mode corresponding to the flag. In some embodiments, one picture may include one or more slices and the high-level syntax for the slice header is a high-level syntax configured for each slice.

The high-level syntax is used to represent whether to allow enabling some tools (methods), namely, enabling some tools (methods) may be allowed or disallowed by a high-level syntax. In some embodiments, as described above, the high-level syntax may be a high-level syntax of a sequence parameter set, or a high-level syntax of a picture parameter set, or a high-level syntax of a slice header, or a high-level syntax of a picture header, which is not limited herein as long as the above functions can be achieved.

For Rate distortion optimized (RDO): there are two indicators for evaluating encoding efficiency: bit rate and PSNR (peak signal to noise ratio). The smaller the bit stream is, the larger the compression rate is; and the higher the PSNR is, the better the quality of a reconstructed picture is. In mode selection, a discriminant formula is essentially a comprehensive evaluation of the two. For example, a cost corresponding to a mode can be calculated according to the following formula: $J(mode)=D+\lambda*R$, where D represents a distortion, usually measured by using a SSE (sum of squared error) indicator, and the SSE refers to a sum of mean square of differences between a reconstructed picture block and a source picture; $\lambda$ represents a Lagrangian multiplier; R represents an actual number of bits required for encoding a picture block in this mode, including a total number of bits required for encoding mode information, motion information, residuals, etc. In mode selection, if comparative decision is made for the encoding mode based on the RDO principle, the optimal encoding performance is usually ensured.

Figure 2A:
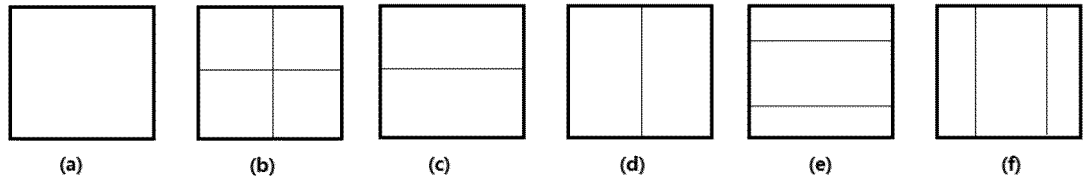
FIGS. 2A and 2B are schematic diagrams illustrating block partition according to an embodiment of the present disclosure.
Figure 2B:
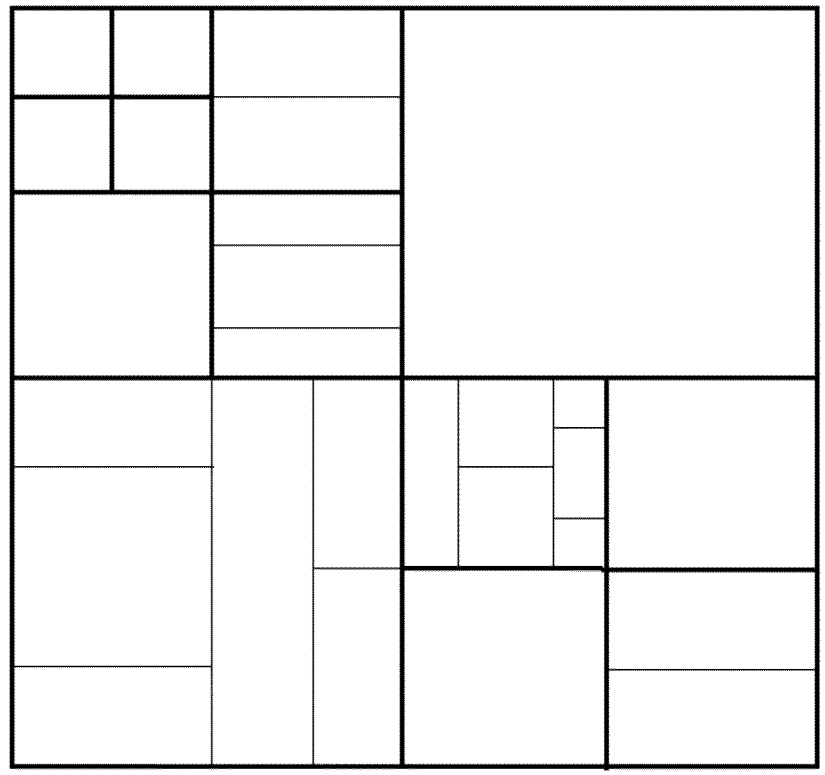

Block partition technology: one coding tree unit (CTU) is partitioned into coding units (CU) by quad tree recursion. Whether to use intra encoding or inter encoding is determined at the leave node CU level. The CU can be partitioned into two or four prediction units (PU) and same prediction information is used in one PU. After residual information is obtained subsequent to completion of the prediction, one CU can be quad-partitioned into a plurality of transform units (TU). For example, in the present disclosure, the current picture block is one PU. Further, the block partition technology may be changed, for example, a partition structure combining binary tree/ternary tree/quad tree is used to replace the original partition mode to cancel the conceptual distinguishment of CU, PU and TU and support more flexible partition of CUs. The CUs may be obtained by square or rectangular partition. The CTU is firstly partitioned by quad tree and then the leaf node of the quad tree partition is partitioned by binary tree and ternary tree. With reference to FIG. 2A, the CUs (e.g., as illustrated by diagram (a) of FIG. 2A) can be partitioned by five partition types which are quad tree partition, horizontal binary tree partition, vertical binary tree partition, horizontal ternary tree partition and vertical ternary tree partition, e.g., as illustrated by diagrams (b)-(f) of FIG. 2A, respecitvely. With reference to FIG. 2B, the partition of the CUs in the CTU may be any combination of the above five partition types. It can be known from the above that different partition manners will enable the PUs to have different shapes, for example, rectangles and squares of different sizes.

The DBF filtering (deblocking filtering) method: the DBF filtering processing includes two processes: a filtering decision and a filtering operation.

The filtering decision includes 1) obtaining a boundary strength value (BS value); 2) a filtering enable decision; and 3) filtering strength selection. For a chroma component, there is only the step 1) and the BS value of a luma component is directly multiplexed. For the chroma component, the filtering operation is performed only when the BS value is 2 (namely, at least one of the blocks at both sides of the current block uses an intra mode).

The filtering operation includes 1) strong filtering and weak filtering for the luma component; and 2) filtering for the chroma component.

In some embodiments, the DBF filtering processing usually includes performing horizontal boundary filtering (also called horizontal DBF filtering) and vertical boundary filtering (also called vertical DBF filtering) with 8*8 pixels as a unit. At most three pixel points at both sides of the boundary are filtered and at most four pixel points at both sides of the boundary are used for filtering. Thus, the horizontal DBF filtering and the vertical DBF filtering of different blocks have no impact on each other, namely, the horizontal DBF filtering and the DBF filtering can be performed in parallel.

Figure 3:
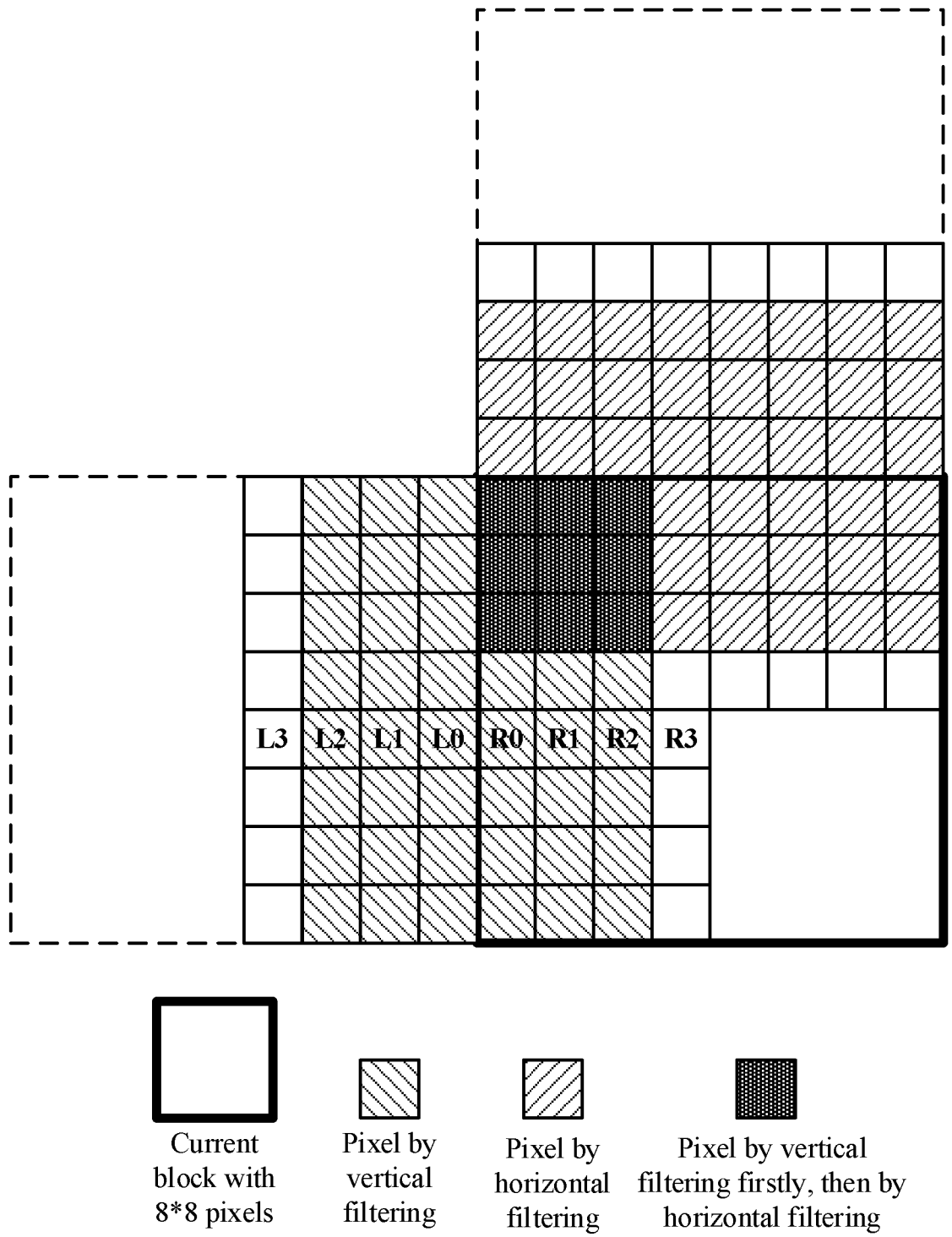
FIG. 3 is a schematic diagram illustrating deblocking filtering according to an embodiment of the present disclosure.

As shown in FIG. 3, for a current block (with 8*8 pixels as an example), the vertical DBF filtering is performed on three columns of pixels points at the left of the current block and three columns of pixel points at the right of the left block (the block on the left of the current block), and then the horizontal DBF filtering is performed on three rows of pixel points at the upper side of the current block and three rows of pixel points at the lower side of the upper block (the block on the upper of the current block).

In some embodiments, for the pixel points to be subjected to the vertical DBF filtering and the horizontal DBF filtering, the vertical DBF filtering is usually performed before the horizontal DBF filtering. Of course, the horizontal DBF filtering may also be performed before the vertical DBF filtering. In subsequent embodiments, as an example, the vertical DBF filtering is performed before the horizontal DBF filtering.

In one possible implementation, the DBF filtering flow may include the following steps.

At step S11, edge condition values of a horizontal direction and a vertical direction are respectively calculated with 4*4 as a unit.

For a CU boundary which is a 8*8 boundary, the edge condition value is 2 (used to indicate that the luma component and the chroma component both are subjected to filtering). For a prediction unit (PU) boundary (e.g. ¼, ½ and ¾ horizontal line inside 2N*hN) which is also a 8*8 boundary, the edge condition value is 1 (used to indicate that the luma component is subjected to filtering but the chroma component is not subjected to filtering). In other circumstances than the above two circumstances, the edge condition value is 0.

At step S12, with 4*4 as a unit (filtering is performed with 8*8 as a unit, but information such as the edge condition value is stored with 4*4 as a unit), the vertical filtering on all blocks is completed. When the edge condition value is not 0, the following filtering process is performed.

1. Luma component filtering (the vertical filtering is performed on the four rows of the vertical boundary and the horizontal filtering is performed on the four columns of the horizontal boundary):

1.1 Whether to skip the filtering process is determined firstly. In some embodiments, if the blocks at both sides of the boundary are non-intra mode blocks with no residuals and consistent motion, the filtering process will be skipped and otherwise, filtering process is performed.

1.2 If the filtering process is not skipped, the following processing is performed.

1.2.1 If the filtering type (df_type) of the current picture is type 1 and ABS(R0-L0)>=4* Alpha, FS is 0; and otherwise, step 1.2.2 is performed to determine FS. Alpha is a predetermined value and ABS ( ) indicates absolute value operation.

1.2.2 FL (Flatness Left, which is valued 0, 2, or 3) and FR (Flatness Right, which is valued 0, 2, or 3) are calculated. The FL and the FR are used to determine a degree of flatness for the interior of both sides. Then, the FS is determined based the FL and the FR. For example, the following formula may be used to determine the FS: FS=FL+FR.

1.2.2.1 If ABS(L1-L0)<Beta and ABS(L2-L0)<Beta, the FL is 3; if ABS(L1-L0)<Beta and ABS(L2-L0)>=Beta, the FL is 2; if ABS(L1-L0)>=Beta and ABS(L2-L0)<Beta, the FL is 1; otherwise, the FL is 0. Beta is a predetermined value and ABS ( ) indicates absolute value operation.

1.2.2.2 The FR can be calculated in the same manner as the FL and will not be repeated herein.

1.2.3 The BS value may be determined based on the FS (the FS may be valued 0, 2, 3, 4, 5 or 6, and the BS may be valued 0, 1, 2, 3 or 4). For example, after the FS is obtained, the BS value may be determined based on the value of the FS.

1.2.3.1 If the FS is less than or equal to 2 (at most one side is moderately flat), the BS=0.

1.2.3.2 If the FS is 3 (only if one side is highly flat), BS=(ABS(L1-R1)<Beta)?1:0, namely, if ABS(L1-R1)<Beta, BS=1, and otherwise BS=0.

1.2.3.3 If the FS is 4 (both sides are moderately flat), BS=(FL==2)?2:1, namely, if FL=2, BS=2, and if the FL is not equal to 2, BS=1.

1.2.3.4 If the FS is 5 (i.e. one side is moderately flat and the other side is highly flat), then:

if the filtering type (df_type) of the current picture is type 1, BS=(R1==R0 && L0==L1 && ABS(R2-L2)<Alpha)?3:2; namely, if the pixel value of the pixel point R1 is equal to the pixel value of the pixel point R0 and the pixel value of the pixel point L0 is equal to the pixel value of the pixel point L1 and an absolute value of a difference between the pixel value of the pixel point R2 and the pixel value of the pixel point L2 is less than Alpha (i.e. a preconfigured value), BS=3, and otherwise B5=2.

Otherwise (namely, when the filtering type (df_type) of the current picture is not type 1), if the filtering type of the current picture is type 0, BS=(R1==R0 && L0==L1)?3:2; namely, the pixel value of the pixel point R1 is equal to the pixel value of the pixel point R0, and the pixel value of the pixel point L0 is equal to the pixel value of the pixel point L1, BS=3 and otherwise, BS=2.

1.2.3.5 If the FS is 6 (both sides are highly flat), then:

if the filtering type (df_type) of the current picture is type 1, BS=(ABS(R0-R1)≤Beta/4 && ABS(L0-L1)<=Beta/4 && ABS(R0-L0)<Alpha) && ABS(R0-R3)<=Beta/2 && ABS(L0-L3)<=Beta/2?4:3; namely, if ABS(R0-R1)<=Beta/4, ABS(L0-L1)<=Beta/4, ABS(R0-L0)<Alpha, ABS(R0-R3)<=Beta/2 and ABS(L0-L3)<=Beta/2 are all satisfied, BS=4 and otherwise B5=3.

Otherwise (i.e. when the filtering type (df_type) of the current picture is not type 1), if the filtering type of the current picture is type 0, BS=(ABS(R0-R1)<=Beta/4 && ABS(L0-L1)<=Beta/4 && ABS(R0-L0)<Alpha)?4: 3; namely, if ABS(R0-R1)<=Beta/4, ABS(L0-L1)<=Beta/4 and ABS(R0-L0)<Alpha are satisfied, BS=4, and otherwise, BS=3.

1.2.4 Based on the BS value, a filtering coefficient and a number of filtered pixels are determined. For example, if four pixel points at the left or the upper side of the boundary are L0 to L3 respectively (as shown in FIG. 3, with the left in FIG. 3 as an example); the four pixel points at the right or lower side of the boundary are R0 to R3 respectively (as shown in FIG. 3, with the right in FIG. 3 as an example). For the luma component:

1.2.4.1 If BS=4, filtering is performed on three pixels at each of both sides of the boundary.

For L0 and R0, the filtering coefficient is [3, 8, 10, 8, 3]/32, namely, in order to determine the filtered pixel value of the pixel point L0, weighted summing is performed for the pixel values of the pixel points L2, L1, L0, R0 and R1 with the respective weighting coefficients (filtering coefficients) sequentially being 3/32, 8/32, 10/32, 8/32 and 3/32. If wj indicates the filtering coefficient, when j=−2 (the second pixel point L2 at the left of the current pixel point), wj=3/32; when j=−1 (the first pixel point L1 at the left of the current pixel point), wj=8/32; when j=0 (the current pixel point, i.e. L0), wj=10/32; when j=1 (the first pixel point R0 at the right of the current pixel point), wj=8/32; when j=2 (the second pixel point R1 at the right of the current pixel point), wj=3/32. In order to determine the filtered pixel value of the pixel point R0, weighted summing is performed for the pixel values of the pixel points R2, R1, R0, L0 and L1 with the respective weighting coefficients sequentially being 3/32, 8/32, 10/32, 8/32 or 3/32. If wj indicates the filtering coefficient, when j=−2 (the second pixel point R2 at the right of the current pixel point), wj=3/32; when j=−1 (the first pixel point R1 at the right of the current pixel point), wj=8/32; when j=0 (the current pixel point, i.e. R0), wj=10/32; when j=1 (the first pixel point L0 at the left of the current pixel point), wj=8/32; when j=2 (the second pixel point L1 at the left of the current pixel point), wj=3/32.

In conclusion, L0'=clip(L2*3+L1*8+L0*10+R0*8+R1*3+16)>>5), where L0' is the filtered pixel value of the pixel point L0, L0 to L2 respectively indicate the pixel values of the pixel points L0 to L2 before being filtered, and R0 to R1 respectively indicate the pixel values of the pixel points R0 to R1, which are the same below. R0'=clip((R2*3+R1*8+R0*10+L0*8+L1*3+16)>>5)>>5).

In the above formulas, ">>" indicates right shift operation to replace division, for example, ">>5" is equivalent to being divided by $2^5$ (32). The multiplication ("*") can be replaced by left shift, for example, α multiplied by 4 may be replaced by shifting two positions leftward, namely, by α<<2; α multiplied by 10 may be replaced with (α<<3)+

($\alpha$1). "<<" is left shift operation to replace multiplication, for example, "$\alpha$<<2" is equivalent to being multiplied by $2^2$ (4). When division operation is performed by shift, an operation result can be directly rounded, namely, when the operation result is a non-integer between N and N+1, the operation result is N. When the fractional part is greater than 0.5, the operation result is obtained as N+1 to increase the accuracy. Therefore, in order to increase the accuracy of the determined pixel value, ½ of the denominator (i.e. dividend) may be added to the numerator of the above weighted sum during operation to achieve the effect of rounding off. Taking the L0' as an example, shifting five positions rightward is equivalent to being divided by $2^5$ (32). As a result, 16 may be added to the numerator of the weighted sum. clip (x) indicates a clip operation. When x is above an upper limit of a predetermined value range, the value of x is set to the upper limit of the predetermined value range; when x is below a lower limit of the predetermined value range, the value of x is set to the lower limit of the predetermined value range.

For L1 and R1, the filtering coefficient is [4, 5, 4, 3]/16, and on this basis, L1'=clip((L2*4+L1*5+L0*4+R0*3+8)>>4), and R1'=clip((R2*4+R1*5+R0*4+L0*3+8)>>4).

For L2 and R2, the filtering coefficient is [2, 2, 2, 1, 1]/8 and thus L2'=clip((L3*2+L2*2+L1*2+L0*1+R0*1+4)>>3), and R2'=clip((R3*2+R2*2+R1*2+R0*1+L0*1+4)>>3).

1.2.4.2 If BS=3, filtering is performed on the two pixels at each of both sides of the boundary:

For L0 and R0, the filtering coefficient is [1, 4, 6, 4, 1]/16, thus L0'=clip(L2*1+L1*4+L0*6+R0*4+R1*1+8)>>4 and R0'=clip(R2*1+R1*4+R0*6+L0*4+L1*1+8)>>4.

For L1 and R1, the filtering coefficient is [3, 8, 4, 1]/16 and thus L1'=clip((L2*3+L1*8+L0*4+R0*1+8)>>4) and R1'=clip((R2*3+R1*8+R0*4+L0*1+8)>>4).

1.2.4.3 If BS=2, filtering is performed on one pixel at each of both sides of the boundary:

For L0 and R0, the filtering coefficient is [3, 10, 3]/16 and on this basis, L0'=clip(L1*3+L0*10+R0*3+8)>>4 and R0'=clip(R1*3+R0*10+L0*3+8)>>4.

1.2.4.4 If BS=1, filtering is performed on one pixel at each of both sides of the boundary: for L0 and R0, the filtering coefficient is [3, 1]/4, and thus L0'=clip (L0*3+R0*1+2)>>2, and R0'=clip (R0*3+L0*1+2)>>2.

1.2.4.5 If BS=0, no filtering is performed, namely, filtering is not performed on the pixels at both sides of the boundary.

2. When the edge condition value is 2, chroma filtering is performed on the boundary of the 16*16 block, namely, filtering of a chroma component is performed on the boundary of the 16*16 block. The filtering process of the chroma component is described below:

2.1 Whether to perform filtering is firstly determined, and its process is similar to that of the luma component and will not be repeated herein.

2.2 If filtering is to be performed (that is, the filtering process is not skipped), the FL and the FR are respectively calculated and then the FS is obtained based on the FL and the FR, and then the BS value is obtained based on the FS. The process is also similar to that of the luma component and thus will not be repeated herein.

2.3 The obtained BS value (e.g. 4, 3, 2, 1, 0 or the like) of the chroma component is reduced by 1, namely, the BS value may be 3, 2, 1, or 0. The filtering process of the chroma component is performed based on the BS value in the following process.

If BS=3, filtering is performed on two pixels at each of both sides of the boundary: for L0 and R0, the filtering coefficient is [3, 10, 3]/16, thus L0'=clip(L1*3+L0*10+R0*3+8)>>4 and R0'=clip(R1*3+R0*10+L0*3+8)>>4. For L1 and R1, the filtering coefficient is [3, 8, 3, 2]/16, and thus L1'=clip((L2*3+L1*8+L0*3+R0*2+8)>>4) and R1'=clip ((R2*3+R1*8+R0*3+L0*2+8)>>4).

If BS=2, or BS=1, filtering is performed on one pixel at each of both sides of the boundary: for L0 and R0, the filtering coefficient is [3, 10, 3]/16, and thus L0'=clip(L1*3+L0*10+R0*3+8)>>4 and R0'=clip(R1*3+R0*10+L0*3+8)>>4. If BS=O, no filtering is performed, namely, filtering is not performed on the pixels at both sides of the boundary.

In some embodiments, the Alpha and the Beta in the above process are related to a QP mean value of the blocks at both sides of the boundary, namely, to the QP mean value of the current block and the left block of the current block (for the vertical DBF filter) or the QP mean value of the current block and the upper block of the current block (for the horizontal DBF filter). The values of the Alpha and the Beta can be obtained by table lookup, which is not limited herein.

At step S13, with 4*4 as a unit (filtering is performed with 8*8 as a unit, and information such as the edge condition value is stored with 4*4 as a unit), horizontal filtering on all blocks is completed, and the implementation is similar to the step S12 and will not be repeated herein.

In the related arts, the filtering technologies such as DBF, SAO and ALF all perform classification based on the pixel value of the current pixel point or based on a relationship between the pixel value of the current pixel point and the pixel value of the surrounding pixel point, and then perform different filtering operations based on different classes. In this case, there may be overfiltering phenomenon, namely, the filtered pixel values are far greater than or far less than the unfiltered pixel values, and far greater than or far less than the original pixel values. Thus, there are problems such as poor filtering effect and poor encoding performance.

For the above discoveries, embodiments of the present disclosure provide an encoding and decoding method, in which an original pixel value of a current pixel point is refined based on a gradient value of the current pixel point to enable a refined pixel value of the current pixel point to be closer to an original pixel, so as to improve the encoding performance. In a filtering process, if a current pixel point in a current block satisfies an enable condition of an enhanced refinement mode, an original pixel value of the current pixel point is refined based on a gradient value of the current pixel point, so as to improve the filtering effect and the encoding performance.

In combination with specific embodiments, the encoding and decoding method in the embodiments of the present disclosure will be detailed below.

Figure 4:
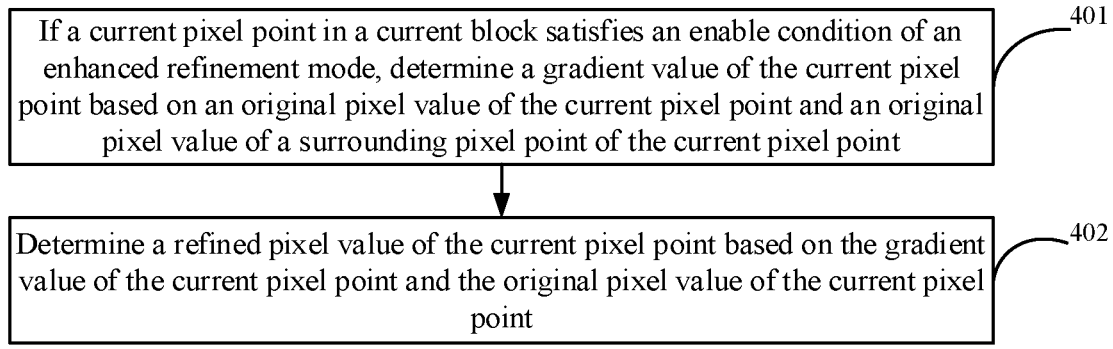
FIG. 4 is a flowchart illustrating an encoding and decoding method according to an embodiment of the present disclosure.

Embodiment 1: The embodiment of the present disclosure provides an encoding and decoding method which is applied to an encoder or decoder. With reference to FIG. 4, it is a schematic flowchart illustrating the encoding and decoding method. The encoding and decoding method may include the following steps.

At step 401, if a current pixel point in a current block satisfies an enable condition of an enhanced refinement mode, a gradient value of the current pixel point is determined based on an original pixel value of the current pixel point and an original pixel value of a surrounding pixel point of the current pixel point.

In some embodiments, the gradient value of the current pixel point may be determined based on a difference between the original pixel value of the current pixel point and the original pixel value of the surrounding pixel point, namely, the gradient value of the current pixel point reflects the difference between the two pixel values.

In some embodiments, the surrounding pixel point of the current pixel point may be a neighboring pixel point of the current pixel point or anon-neighboring pixel point of the current pixel point. The surrounding pixel point of the current pixel point may be one or more pixel points located in the current block or one or more pixel points located in a neighboring block of the current block. For example, the surrounding pixel point of the current pixel point may be a pixel point at the left of the current pixel point, or a pixel point at the right of the current pixel point or a pixel point at the upper side of the current pixel point, or a pixel point at the lower side of the current pixel point. In embodiments, the position of the surrounding pixel point of the current pixel point is not limited herein.

For example, as shown in FIG. 3, if the current pixel point is R0 in the current block, the surrounding pixel point of the current pixel point may be L0 in the left neighboring block of the current block. If the current pixel point is a pixel point of a first row and a second column in the current block, the surrounding pixel point of the current pixel point may be a pixel point of an eighth row and a second column in the upper neighboring block of the current block.

At step 402, a refined pixel value of the current pixel point is determined based on the gradient value of the current pixel point and the original pixel value of the current pixel point. For example, the refined pixel value of the current pixel point may be determined based on the gradient value of the current pixel point, the original pixel value of the current pixel point, a first refinement threshold, a second refinement threshold, a first refinement offset value, and a second refinement offset value.

In one possible implementation, if the gradient value of the current pixel point is greater than the first refinement threshold, the refined pixel value of the current pixel point is determined based on the original pixel value of the current pixel point and the first refinement offset value. For example, based on a sum of the original pixel value of the current pixel point and the first refinement offset value, the refined pixel value of the current pixel point is determined. If the gradient value of the current pixel point is less than the second refinement threshold, the refined pixel value of the current pixel point is determined based on the original pixel value of the current pixel point and the second refinement offset value. For example, based on a sum of the original pixel value of the current pixel point and the second refinement offset value, the refined pixel value of the current pixel point is determined. In some embodiments, the first refinement threshold and the second refinement threshold may be opposite numbers to each other. Of course, the first refinement threshold and the second refinement threshold may also not be opposite numbers to each other and may be set arbitrarily.

In one possible implementation, if the current pixel point in the current block satisfies the enable condition of the enhanced refinement mode, a reference pixel point corresponding to the current pixel point may be determined from a neighboring block of the current block, and a gradient value of the reference pixel point is determined based on an original pixel value of the reference pixel point and an original pixel value of a surrounding pixel point of the reference pixel point; based on the gradient value of the reference pixel point and the original pixel value of the reference pixel point, an refined pixel value of the reference pixel point is determined.

In some embodiments, the reference pixel point may be a pixel point neighboring the current pixel point in the neighboring block, or a pixel point not neighboring the current pixel point in the neighboring block, which is not limited herein. For example, as shown in FIG. 3, if the current pixel point is R0 in the current block, the reference pixel point may be L0 in the left neighboring block of the current block, or L1 or L2 or the like in the left neighboring block of the current block, which is not limited herein. If the current pixel point is R1 in the current block, the reference pixel point may be L0 in the left neighboring block of the current block or L1 or L2 or the like in the left neighboring block of the current block, which is not limited herein. If the current pixel point is a pixel point of a first row and a second column in the current block, the reference pixel point may be a pixel point of an eighth row and a second column in the upper neighboring block of the current block, or a pixel point of a seventh row and a second column in the upper neighboring block of the current block, which is not limited herein.

In some embodiments, the gradient value of the reference pixel point may be determined based on a difference between the original pixel value of the reference pixel point and the original pixel value of the surrounding pixel point of the reference pixel point, namely, the gradient value reflects the difference between the two pixel values.

In some embodiments, the surrounding pixel point of the reference pixel point may be a neighboring pixel point of the reference pixel point or a non-neighboring pixel point of the reference pixel point. The surrounding pixel point of the reference pixel point may be a pixel point located in a block where the reference pixel point is located or a pixel point located in a neighboring block of a block where the reference pixel point is located. For example, the surrounding pixel point of the reference pixel point may be a pixel point at the left of the reference pixel point, or a pixel point at the right of the reference pixel point or a pixel point at the upper side of the reference pixel point, or a pixel point at the lower side of the reference pixel point. In embodiments, the position of the surrounding pixel point of the reference pixel point is not limited herein.

In one possible implementation, the surrounding pixel point of the reference pixel point may be the current pixel point in the current block and similarly, the surrounding pixel point of the current pixel point may be the reference pixel point in the neighboring block of the current block.

In some embodiments, based on the gradient value of the reference pixel point and the original pixel value of the reference pixel point, determining the refined pixel value of the reference pixel point may include but not limited to: based on the gradient value of the reference pixel point and the original pixel value of the reference pixel point, a third refinement threshold (same as or different from the first refinement threshold), a fourth refinement threshold (same as or different from the second refinement threshold), a third refinement offset value (same as or different from the first refinement offset value) and a fourth refinement offset value (same as or different form the third refinement offset value), determining the refined pixel value of the reference pixel point.

For example, if the gradient value of the reference pixel point is greater than the third refinement threshold, the refined pixel value of the reference pixel point is determined based on the original pixel value of the reference pixel point and the third refinement offset value, for example, the refined pixel value of the reference pixel point is determined based on a sum of the original pixel value of the reference pixel point and the third refinement offset value. If the gradient value of the reference pixel point is less than the fourth refinement threshold, the refined pixel value of the reference pixel point is determined based on the original pixel value of the reference pixel point and the fourth refinement offset value, for example, the refined pixel value of the reference pixel point is determined based on a sum of the original pixel value of the reference pixel point and the fourth refinement offset value.

In some embodiments, the third refinement threshold and the fourth refinement threshold may be opposite numbers to each other. Of course, the third refinement threshold and the fourth refinement threshold may also not be opposite numbers to each other and may be set arbitrarily.

In one possible implementation, the first refinement threshold, the second refinement threshold, the first refinement offset value, the second refinement offset value, the third refinement threshold, the fourth refinement threshold, the third refinement offset value and the fourth refinement offset value corresponding to the current block are determined from a high-level syntax. Optionally, the first refinement threshold, the first refinement offset value, the second refinement offset value, the third refinement threshold, the third refinement offset value and the fourth refinement offset value corresponding to the current block are determined from the high-level syntax. Optionally, the second refinement threshold, the first refinement offset value, the second refinement offset value, the third refinement threshold, the third refinement offset value and the fourth refinement offset value corresponding to the current block are determined from the high-level syntax. Optionally, the first refinement threshold, the first refinement offset value, the second refinement offset value, the fourth refinement threshold, the third refinement offset value and the fourth refinement offset value corresponding to the current block are determined from the high-level syntax. Optionally, the second refinement threshold, the first refinement offset value, the second refinement offset value, the fourth refinement threshold, the third refinement offset value and the fourth refinement offset value corresponding to the current block are determined from the high-level syntax.

In some embodiments, if the first refinement threshold and the second refinement threshold are opposite numbers to each other, the second refinement threshold may be derived after the first refinement threshold is determined from the high-level syntax; and the first refinement threshold may be derived after the second refinement threshold is determined from the high-level syntax. If the third refinement threshold and the fourth refinement threshold are opposite numbers to each other, the fourth refinement threshold may be derived after the third refinement threshold is determined from the high-level syntax; and the third refinement threshold may be derived after the fourth refinement threshold is determined from the high-level syntax.

In one possible implementation, determining that the current pixel point in the current block satisfies the enable condition of the enhanced refinement mode may include but not limited to: if a boundary strength of a to-be-filtered boundary corresponding to the current pixel point in the current block satisfies the enable condition of the enhanced refinement mode, determining that the current pixel point satisfies the enable condition of the enhanced refinement mode. For example, if the boundary strength of the to-be-filtered boundary corresponding to the current pixel point is a predetermined first value, it is determined that the boundary strength of the to-be-filtered boundary satisfies the enable condition of the enhanced refinement mode. In some embodiments, the predetermined first value may be 0. Of course, the predetermined first value may also be another number.

Optionally, if feature information corresponding to the current block satisfies the enable condition of the enhanced refinement mode, it is determined that the current pixel point in the current block satisfies the enable condition of the enhanced refinement mode. In some embodiments, the feature information corresponding to the current block satisfies the enable condition of the enhanced refinement mode, which means that, if it is determined not to enable filtering operation (deblocking filtering operation or the like) for the current block based on the feature information corresponding to the current block, it is determined that the feature information corresponding to the current block satisfies the enable condition of the enhanced refinement mode.

In some embodiments, before it is determined that the current pixel point in the current block satisfies the enable condition of the enhanced refinement mode, an enhanced refinement mode enable flag corresponding to the current block may be obtained. If the enhanced refinement mode enable flag corresponding to the current block allows the current block to enable the enhanced refinement mode, it is determined whether the current pixel point in the current block satisfies the enable condition of the enhanced refinement mode, that is, it is determined that the current pixel point in the current block satisfies the enable condition of the enhanced refinement mode or does not satisfy the enable condition of the enhanced refinement mode.

Optionally, if the enhanced refinement mode enable flag corresponding to the current block disallows the current block to enable the enhanced refinement mode, it is directly determined that the current pixel point in the current block does not satisfy the enable condition of the enhanced refinement mode.

In some embodiments, for the decoder, the enhanced refinement mode enable flag corresponding to the current block is determined from the high-level syntax and then based on the enhanced refinement mode enable flag, whether to allow the current block to enable the enhanced refinement mode is determined.

For example, if a value of the enhanced refinement mode enable flag is a first value (e.g. 1), the enhanced refinement mode enable flag allows the current block to enable the enhanced refinement mode; if a value of the enhanced refinement mode enable flag is a second value (e.g. 0), the enhanced refinement mode enable flag disallows the current block to enable the enhanced refinement mode.

In one possible implementation, if the encoding and decoding method is applied to a prediction process (e.g. intra prediction or inter prediction), the original pixel value of the current pixel point may be a prediction value obtained by intra prediction or inter prediction, and the refined pixel value of the current pixel point is taken as a target pixel value of the current pixel point (the final pixel value of the prediction process). If the encoding and decoding method is applied to a filtering process, the original pixel value of the current pixel point may be a pre-filtering prediction value, and the refined pixel value of the current pixel point is taken as a target pixel value of the current pixel point (the final pixel value of the filtering process).

It can be seen from the above technical solutions that, in the embodiments of the present disclosure, if a current pixel point in a current block satisfies an enable condition of an enhanced refinement mode, an refined pixel value of the current pixel point may be determined based on a gradient value of the current pixel point and an original pixel value of the current pixel point, namely, refinement is performed on the original pixel value of the current pixel point based on the gradient value of the current pixel point to enable the refined pixel value of the current pixel point to be closer to the original pixel, thus improving the encoding performance. In filtering processes such as DBF, SAO and ALF, if a current pixel point in a current block satisfies an enable condition of an enhanced refinement mode, refinement may be performed on an original pixel value of the current pixel point based on a gradient value of the current pixel point to improve the filtering effect and the encoding performance.

In one possible implementation, if the current pixel point in the current block satisfies an enable condition of a general filtering mode, deblocking filtering (DBF filtering) may also be performed on the original pixel value of the current pixel point to obtain a filtered pixel value of the current pixel point. Of course, the deblocking filtering is only an example, and thus another filtering mode may be used to perform filtering on the original pixel value of the current pixel point. For example, SAO filtering is performed on the original pixel value of the current pixel point to obtain the filtered pixel value of the current pixel point. Alternatively, ALF filtering is performed on the original pixel value of the current pixel point to obtain the filtered pixel value of the current pixel point.

In some embodiments, with deblocking filtering as an example, by referring to steps S11 to 13, deblocking filtering is performed on the original pixel value of the current pixel point to obtain the filtered pixel value of the current pixel point, which is not repeated herein.

With continuous reference to the steps S11 to 13, it can be seen from these steps that if the blocks at both sides of the boundary are non-intra mode blocks with no residuals and consistent motion, the filtering process will be skipped and otherwise, the filtering process will be performed. When filtering process is to be performed, the BS value may also be obtained. If the BS value is equal to 0, no filtering is performed, namely, filtering is not performed on the pixels at both sides of the boundary. If the BS value is greater than 0, filtering is performed on the pixels at both sides of the boundary. In conclusion, if the blocks at both sides of the boundary are non-intra mode blocks with no residuals and consistent motion, the current pixel point in the current block does not satisfy the enable condition of the general filtering mode. If a condition that the blocks at both sides of the boundary are non-intra mode blocks with no residuals and consistent motion is not satisfied (i.e. the blocks at both sides of the boundary are not non-intra mode blocks, or the blocks at both sides of the boundary have residuals or the motions of the blocks at both sides of the boundary are not consistent) and BS is equal to 0, the current pixel point in the current block does not satisfy the enable condition of the general filtering mode. If the condition that the blocks at both sides of the boundary are non-intra mode blocks with no residuals and consistent motion is not satisfied and BS is greater than 0, the current pixel point in the current block satisfies the enable condition of the general filtering mode.

It is to be noted that, if the current pixel point in the current block satisfies the enable condition of the general filtering mode, the current pixel point in the current block does not satisfy the enable condition of the enhanced refinement mode; if the current pixel point in the current block satisfies the enable condition of the enhanced refinement mode, the current pixel point in the current block does not satisfy the enable condition of the general filtering mode.

On the basis of the fact that the current pixel point satisfies the enable condition of the general filtering mode and the deblocking filtering is performed on the original pixel value of the current pixel point to obtain the filtered pixel value of the current pixel point, it is further to be determined whether the current pixel point in the current block satisfies an enable condition of an enhanced filtering mode. If the current pixel point in the current block satisfies the enable condition of the enhanced filtering mode, the refined pixel value of the current pixel point is determined based on the filtered pixel value of the current pixel point and the original pixel value of the current pixel point, and the refined pixel value of the current pixel point is taken as the target pixel value of the current pixel point (the final pixel value of the deblocking filtering process). If the current pixel point in the current block does not satisfy the enable condition of the enhanced filtering mode, the filtered pixel value of the current pixel point is not adjusted, but taken as the target pixel value of the current pixel point (the final pixel value of the deblocking filtering process).

In some embodiments, if the current pixel point in the current block satisfies the enable condition of the enhanced filtering mode, the refined pixel value of the current pixel point is determined based on the filtered pixel value of the current pixel point and the original pixel value of the current pixel point, which may include but not limited to: based on the filtered pixel value of the current pixel point, the original pixel value of the current pixel point, a first filtering threshold, a second filtering threshold, a first filtering offset value and a second filtering offset value, determining the refined pixel value of the current pixel point.

In some embodiments, the first filtering threshold and the second filtering threshold may be opposite numbers to each other. Of course, the first filtering threshold and the second filtering threshold may also not be opposite numbers to each other and may be set arbitrarily.

In one possible implementation, if the current pixel point in the current block satisfies the enable condition of the general filtering mode, a reference pixel point corresponding to the current pixel point may also be determined from a neighboring block of the current block, and deblocking filtering (DBF filtering) is performed on an original pixel value of the reference pixel point to obtain a filtered pixel value of the reference pixel point. Of course, the deblocking filtering is only an example, and another filtering mode may be used to perform filtering on the original pixel value of the reference pixel point. For example, SAO filtering or ALF filtering is performed on the original pixel value of the reference pixel point to obtain the filtered pixel value of the reference pixel point.

In some embodiments, with deblocking filtering as an example, by referring to steps S11 to 13, deblocking filtering is performed on the original pixel value of the reference pixel point to obtain the filtered pixel value of the reference pixel point, which is not repeated herein.

In some embodiments, the reference pixel point may be a pixel point neighboring the current pixel point in the neighboring block, or a pixel point not neighboring the current pixel point in the neighboring block, which is not limited herein.

On the basis of the fact that the current pixel point satisfies the enable condition of the general filtering mode and the deblocking filtering is performed on the original pixel value of the reference pixel point to obtain the filtered pixel value of the reference pixel point, it is further to be determined whether the current pixel point in the current block satisfies the enable condition of the enhanced filtering mode. If the current pixel point in the current block satisfies the enable condition of the enhanced filtering mode, a refined pixel value of the reference pixel point is determined based on the filtered pixel value of the reference pixel point and the original pixel value of the reference pixel point, and the refined pixel value of the reference pixel point is taken as the target pixel value of the reference pixel point (the final pixel value of the deblocking filtering process). If the current pixel point in the current block does not satisfy the enable condition of the enhanced filtering mode, the filtered pixel value of the reference pixel point is not adjusted, and the filtered pixel value of the reference pixel point is taken as the target pixel value of the reference pixel point (the final pixel value of the deblocking filtering process).

In some embodiments, determining the refined pixel value of the reference pixel point based on the filtered pixel value of the reference pixel point and the original pixel value of the reference pixel point may include but not limited to: based on the filtered pixel value of the reference pixel point, the original pixel value of the reference pixel point, a third filtering threshold, a fourth filtering threshold, a third filtering offset value, and a fourth filtering offset value, determining the refined pixel value of the reference pixel point, where the third filtering threshold and the fourth filtering threshold may be opposite numbers to each other. Of course, the third filtering threshold and the fourth filtering threshold may also not be opposite numbers to each other and may be set arbitrarily.

In one possible implementation, the first filtering threshold, the second filtering threshold, the first filtering offset value, the second filtering offset value, the third filtering threshold, the fourth filtering threshold, the third filtering offset value and the fourth filtering offset value corresponding to the current block are determined from a high-level syntax. Optionally, the first filtering threshold, the first filtering offset value, the second filtering offset value, the third filtering threshold, the third filtering offset value and the fourth filtering offset value corresponding to the current block are determined from the high-level syntax. Optionally, the second filtering threshold, the first filtering offset value, the second filtering offset value, the third filtering threshold, the third filtering offset value and the fourth filtering offset value corresponding to the current block are determined from the high-level syntax. Optionally, the first filtering threshold, the first filtering offset value, the second filtering offset value, the fourth filtering threshold, the third filtering offset value and the fourth filtering offset value corresponding to the current block are determined from the high-level syntax. Optionally, the second filtering threshold, the first filtering offset value, the second filtering offset value, the fourth filtering threshold, the third filtering offset value and the fourth filtering offset value corresponding to the current block are determined from the high-level syntax.

In some embodiments, if the first filtering threshold and the second filtering threshold are opposite numbers to each other, the second filtering threshold may be derived after the first filtering threshold is determined from the high-level syntax; and the first filtering threshold may be derived after the second filtering threshold is determined from the high-level syntax. If the third filtering threshold and the fourth filtering threshold are opposite numbers to each other, the fourth filtering threshold may be derived after the third filtering threshold is determined from the high-level syntax; and the third filtering threshold may be derived after the fourth filtering threshold is determined from the high-level syntax.

In one possible implementation, determining that the current pixel point in the current block satisfies the enable condition of the enhanced filtering mode may include but not limited to: if a boundary strength of a to-be-filtered boundary corresponding to the current pixel point in the current block satisfies the enable condition of the enhanced filtering mode and an absolute value of a difference between the filtered pixel value of the current pixel point and the original pixel value of the current pixel point is greater than a predetermined threshold (the threshold is a positive value, which is not limited herein; for example, if the first filtering threshold and the second filtering threshold are opposite numbers to each other, when the first filtering threshold is a positive value, the predetermined threshold is same as the first filtering threshold; when the second filtering threshold is a positive value, the predetermined threshold is same as the second filtering threshold, and of course, the predetermined threshold may also be another value), determining that the current pixel point satisfies the enable condition of the enhanced filtering mode. In some embodiments, the boundary strength of the to-be-filtered boundary corresponding to the current pixel point in the current block satisfies the enable condition of the enhanced filtering mode, which may include but not limited to: if the boundary strength of the to-be-filtered boundary corresponding to the current pixel point is a predetermined second value (it is different from the predetermined first value, namely, is not 0, for example, the predetermined second value is greater than 0), determining that the boundary strength of the to-be-filtered boundary satisfies the enable condition of the enhanced filtering mode.

In some embodiments, before it is determined that the current pixel point in the current block satisfies the enable condition of the enhanced filtering mode, an enhanced filtering mode enable flag corresponding to the current block may be obtained. If the enhanced filtering mode enable flag corresponding to the current block allows the current block to enable the enhanced filtering mode, it is determined whether the current pixel point in the current block satisfies the enable condition of the enhanced filtering mode, that is, it is determined that the current pixel point in the current block satisfies the enable condition of the enhanced filtering mode or does not satisfy the enable condition of the enhanced filtering mode.

Optionally, if the enhanced filtering mode enable flag corresponding to the current block disallows the current block to enable the enhanced filtering mode, it is directly determined that the current pixel point in the current block does not satisfy the enable condition of the enhanced filtering mode.

In some embodiments, for the decoder, the enhanced filtering mode enable flag corresponding to the current block is parsed out from the high-level syntax and then based on the enhanced filtering mode enable flag, whether to allow the current block to enable the enhanced filtering mode is determined.

For example, if a value of the enhanced filtering mode enable flag is a first value (e.g.¶1), the enhanced filtering mode enable flag allows the current block to enable the enhanced filtering mode; if a value of the enhanced filtering mode enable flag is a second value (e.g. 0), the enhanced filtering mode enable flag disallows the current block to enable the enhanced filtering mode.

In some embodiments, in the above embodiments, the high-level syntax includes but not limited to one of the following syntaxes: a sequence parameter set (SPS) high-level syntax, a picture parameter set (PPS) high-level syntax, a picture header high-level syntax, a picture high-level syntax; a slice header high-level syntax, a coding tree unit (CTU) high-level syntax, and a coding unit (CU) high-level syntax.

In some embodiments, in the above embodiments, the pixel value of the current pixel point in the current block may be a luma component or a chroma component.

It can be seen from the above technical solutions that, if a current pixel point in a current block satisfies an enable condition of an enhanced filtering mode, an refined pixel value of the current pixel point may be determined based on a filtered pixel value of the current pixel point and an original pixel value of the current pixel point, namely, refinement is performed on the original pixel value of the current pixel point based on the filtered pixel value of the current pixel point to enable the refined pixel value of the current pixel point to be closer to the original pixel, thus improving the encoding performance. In filtering processes such as DBF, SAO and ALF, if a current pixel point in a current block satisfies an enable condition of an enhanced filtering mode, refinement may be performed on an original pixel value of the current pixel point based on a filtered pixel value of the current pixel point to improve the filtering effect and the encoding performance.

Embodiment 2: when filtering is to be performed, whether to skip the filtering process is first determined. For example, if the blocks at both sides of the boundary (i.e. the current block and the neighboring block of the current block, which, for a vertical boundary, is the left neighboring block of the current block, and for the horizontal boundary, is the upper neighboring block of the current block) are non-intra mode blocks (namely, neither of the current block and the neighboring block is an intra block), with no residuals (no residuals between the current block and the neighboring block) but with consistent motion (the current block and the neighboring block are consistent in motion), the filtering process is skipped, and otherwise, the filtering process is not skipped. Thus, "skip the filtering process" may be used as the enable condition of the enhanced refinement mode, namely, if the filtering process is skipped for the current pixel point in the current block, the current pixel point in the current block satisfies the enable condition of the enhanced refinement mode. When the current pixel point satisfies the enable condition of the enhanced refinement mode, the original pixel value of the current pixel point may be refined based on the enhanced refinement mode, so as to enable the pixel value to be closer to the original pixel.

In some embodiments, if feature information corresponding to the current block satisfies the enable condition of the enhanced refinement mode, it is determined that the current pixel point in the current block satisfies the enable condition of the enhanced refinement mode. The feature information corresponding to the current block is used to indicate whether the blocks at both sides of the boundary are non-intra mode blocks, to indicate whether the blocks at both sides of the boundary have no residuals and to indicate whether the blocks at both sides of the boundary are consistent in motion. As a result, if the feature information corresponding to the current block is used to indicate the blocks at both sides of the boundary are non-intra mode blocks, to indicate the blocks at both sides of the boundary have no residuals and to indicate whether the blocks at both sides of the boundary are consistent in motion, it indicates that the feature information corresponding to the current block satisfies the enable condition of the enhanced refinement mode, and it is determined that the current pixel point in the current block satisfies the enable condition of the enhanced refinement mode, namely, each pixel point in the current block satisfies the enable condition of the enhanced refinement mode. Optionally, if the feature information corresponding to the current block is used to indicate the blocks at both sides of the boundary are all not non-intra mode blocks, and/or, the feature information corresponding to the current block is used to indicate the blocks at both sides of the boundary have residuals, and/or, the feature information corresponding to the current block is used to indicate the blocks at both sides of the boundary are not consistent in motion, it indicates that the feature information corresponding to the current block does not satisfy the enable condition of the enhanced refinement mode, and it is determined that the current pixel point in the current block does not satisfy the enable condition of the enhanced refinement mode, namely, each pixel point in the current block does not satisfy the enable condition of the enhanced refinement mode.

In some embodiments, when the current pixel point satisfies the enable condition of the enhanced refinement mode, the original pixel value of the current pixel point may be refined based on the enhanced refinement mode. For example, a gradient value of the current pixel point is determined based on the original pixel value of the current pixel point and the refined pixel value of the current pixel point is determined based on the gradient value of the current pixel point and the original pixel value of the current pixel point. The refinement process of the refined pixel value may be referred to the subsequent embodiments and will not be repeated herein.

Embodiment 3: when filtering is to be performed, whether to skip the filtering process is firstly determined. For example, if the blocks at both sides of the boundary are non-intra model blocks with no residuals but with consistent motion, the filtering process is skipped, and otherwise, the filtering process is not skipped. When the filtering process is not skipped, the BS value may also be determined. If the BS value is greater than 0 (for example, the BS value is 1, 2, 3, 4 or the like), filtering may be performed on the pixels at both sides of the boundary. If the BS value is 0, no filtering is performed, namely, filtering is not performed on the pixels at both sides of the boundary. Thus, "the BS value is 0" may be taken as the enable condition of the enhanced refinement mode, namely, if the BS value of the current pixel point in the current block is 0, the current pixel point in the current block satisfies the enable condition of the enhanced refinement mode; if the BS value of the current pixel point in the current block is greater than 0, the current pixel point in the current block does not satisfy the enable condition of the enhanced refinement mode.

In some embodiments, if the boundary strength of the to-be-filtered boundary corresponding to the current pixel point in the current block satisfies the enable condition of the enhanced refinement mode, it is determined that the current pixel point satisfies the enable condition of the enhanced refinement mode. For example, the boundary strength of the to-be-filtered boundary corresponding to the current pixel point is firstly determined. If the boundary strength is a predetermined first value, it is determined that the boundary strength satisfies the enable condition of the enhanced refinement mode. The predetermined first value may be set based on experiences, for example, set to 0. In conclusion, the boundary strength of the to-be-filtered boundary corresponding to the current pixel point is 0, it indicates that the boundary strength of the to-be-filtered boundary corresponding to the current pixel point satisfies the enable condition of the enhanced refinement mode, and it is determined that the current pixel point satisfies the enable condition of the enhanced refinement mode.

Optionally, if the boundary strength of the to-be-filtered boundary corresponding to the current pixel point in the current block does not satisfy the enable condition of the enhanced refinement mode, it is determined that the current pixel point does not satisfy the enable condition of the enhanced refinement mode. For example, if the boundary strength of the to-be-filtered boundary corresponding to the current pixel point is not the predetermined first value, it is determined that the boundary strength does not satisfy the enable condition of the enhanced refinement mode. Thus, it is determined that the current pixel point in the current block does not satisfy the enable condition of the enhanced refinement mode.

In some embodiments, when the current pixel point satisfies the enable condition of the enhanced refinement mode, the original pixel value of the current pixel point may be refined based on the enhanced refinement mode so as to enable the pixel value to be closer to the original pixel. For example, a gradient value of the current pixel point is determined based on the original pixel value of the current pixel point and the refined pixel value of the current pixel point is determined based on the gradient value of the current pixel point and the original pixel value of the current pixel point. The refinement process of the refined pixel value may be referred to the subsequent embodiments.

Embodiment 4: when filtering is to be performed, whether to skip the filtering process is firstly determined. For example, if the blocks at both sides of the boundary are non-intra model blocks with no residuals but with consistent motion, the filtering process is skipped, and otherwise, the filtering process is not skipped. When the filtering process is not skipped, the BS value may also be determined. If the BS value is greater than 0 (for example, the BS value is 1, 2, 3, 4 or the like), filtering may be performed on the pixels at both sides of the boundary. If the BS value is 0, no filtering is performed, namely, filtering is not performed on the pixels at both sides of the boundary. Thus, "the BS value is greater than 0" may be taken as the enable condition of the general filtering mode, namely, if the BS value of the current pixel point in the current block is greater than 0, the current pixel point in the current block satisfies the enable condition of the general filtering mode; if the BS value of the current pixel point in the current block is equal to 0, the current pixel point in the current block does not satisfy the enable condition of the general filtering mode.

In some embodiments, if the boundary strength of the to-be-filtered boundary corresponding to the current pixel point in the current block satisfies the enable condition of the general filtering mode, it is determined that the current pixel point satisfies the enable condition of the general filtering mode. For example, the boundary strength of the to-be-filtered boundary corresponding to the current pixel point may be firstly determined. If the boundary strength is a predetermined second value, it is determined that the boundary strength satisfies the enable condition of the general filtering mode. The predetermined second value may be set based on experiences, for example, may be set to greater than 0, such as 1, 2, 3, 4 or the like. In a word, if the boundary strength of the to-be-filtered boundary corresponding to the current pixel point is greater than 0 (i.e. the boundary strength is not 0), it indicates that the boundary strength of the to-be-filtered boundary corresponding to the current pixel point satisfies the enable condition of the general filtering mode, and it is determined that the current pixel point satisfies the enable condition of the general filtering mode.

Alternatively, if the boundary strength of the to-be-filtered boundary corresponding to the current pixel point in the current block does not satisfy the enable condition of the general filtering mode, it is determined that the current pixel point does not satisfy the enable condition of the general filtering mode. For example, the boundary strength (e.g. 0) of the to-be-filtered boundary corresponding to the current pixel point is not the predetermined second value, it is determined that the boundary strength does not satisfy the enable condition of the general filtering mode. Thus, it is determined that the current pixel point in the current block does not satisfy the enable condition of the general filtering mode.

In some embodiments, when the current pixel point satisfies the enable condition of the general filtering mode, deblocking filtering (DBF filtering, which is used as an example herein) may be performed on the original pixel value of the current pixel point to obtain the filtered pixel value of the current pixel point.

Embodiment 5: On the basis of the fact that the current pixel point in the current block satisfies the enable condition of the general filtering mode and the deblocking filtering is performed on the original pixel value of the current pixel point to obtain the filtered pixel value of the current pixel point, it is further to be determined whether the current pixel point in the current block satisfies the enable condition of the enhanced filtering mode. For example, it is determined whether an absolute value of a difference between the filtered pixel value of the current pixel point and the original pixel value of the current pixel point is greater than a predetermined threshold. If the absolute value is greater than the predetermined threshold, it is determined the current pixel point in the current block satisfies the enable condition of the enhanced filtering mode; if the absolute value is not greater than the predetermined threshold, it is determined that the current pixel point in the current block does not satisfy the enable condition of the enhanced filtering mode. In conclusion, satisfying, by the current pixel point in the current block, the enable condition of the enhanced filtering mode may include: if the boundary strength of the to-be-filtered boundary corresponding to the current pixel point in the current block satisfies the enable condition of the enhanced filtering mode, and the absolute value of the difference between the filtered pixel value of the current pixel point and the original pixel value of the current pixel point is greater than the predetermined threshold, determining the current pixel point satisfies the enable condition of the enhanced filtering mode.

In combination with specific embodiments, the enable condition of the enhanced filtering mode will be described below.

When filtering is to be performed, whether to skip the filtering process is firstly determined. When the filtering process is not skipped, the BS value may also be determined. If the BS value is greater than 0, filtering may be performed on the pixels at both sides of the boundary. Therefore, "the BS value is greater than 0" is taken as the enable condition of the enhanced filtering mode, namely, "the BS value is greater than 0" is taken as the enable conditions of the general filtering mode and the enhanced filtering mode at the same time. When the BS value is greater than 0, deblocking filtering is to be performed on the original pixel value of the current pixel point to obtain the filtered pixel value of the current pixel point. After the filtered pixel value of the current pixel point is obtained, it is further determined whether the absolute value of the difference between the filtered pixel value of the current pixel point and the original pixel value of the current pixel point is greater than a predetermined threshold and "the absolute value of the difference is greater than the predetermined threshold" is taken as the enable condition of the enhanced filtering mode.

In conclusion, if the boundary strength of the to-be-filtered boundary corresponding to the current pixel point in the current block satisfies the enable condition of the enhanced filtering mode, and the absolute value of the difference between the filtered pixel value of the current pixel point and the original pixel value of the current pixel point is greater than the predetermined threshold, it is determined that the current pixel point satisfies the enable condition of the enhanced filtering mode. Otherwise, it is determined that the current pixel point does not satisfy the enable condition of the enhanced filtering mode. For example, the boundary strength of the to-be-filtered boundary corresponding to the current pixel point is firstly determined. If the boundary strength is a predetermined second value, it is determined that the boundary strength satisfies the enable condition of the enhanced filtering mode. The predetermined second value is set based on experiences, for example, set to greater than 0, such as 1, 2, 3, or 4 or the like.

In some embodiments, when the current pixel point satisfies the enable condition of the enhanced filtering mode, the refined pixel value of the current pixel point may be determined based on the filtered pixel value of the current pixel point and the original pixel value of the current pixel point, and then the refined pixel value of the current pixel point is taken as the target pixel value of the current pixel point (the final pixel value of the deblocking filtering process). If the current pixel point in the current block does not satisfy the enable condition of the enhanced filtering mode, the filtered pixel value of the current pixel point is not adjusted but taken as the target pixel value of the current pixel point (the final pixel value of the deblocking filtering process).

It can be seen from the above embodiments 1, 2, 3, 4 and 5 that, based on the enhanced refinement mode, the general filtering mode and the enhanced filtering mode involved in the present disclosure, the original pixel value of the current pixel point is processed to obtain the target pixel value of the current pixel point (i.e. the final pixel value). For example, if the current pixel point satisfies the enable condition of the enhanced refinement mode, the original pixel value of the current pixel point may be refined based on the gradient value of the current pixel point under the enhanced refinement mode to obtain the refined pixel value of the current pixel point, and the refined pixel value is taken as the target pixel value. For another example, if the current pixel point satisfies the enable condition of the general filtering mode but does not satisfy the enable condition of the enhanced filtering mode, the original pixel value of the current pixel point may be filtered under the general filtering mode to obtain the filtered pixel value of the current pixel point, and the filtered pixel value is taken as the target pixel value. For another example, if the current pixel point satisfies both the enable condition of the general filtering mode and the enable condition of the enhanced filtering mode, the original pixel value of the current pixel point is filtered under the enhanced filtering mode to obtain the filtered pixel value of the current pixel point, and the original pixel value of the current pixel point is refined based on the filtered pixel value of the current pixel point to obtain the refined pixel value of the current pixel point, and then the filtered pixel value is taken as the target pixel value.

In one possible implementation, deblocking filtering is performed on the current block, the original pixel value of the current pixel point in the current block may be processed based on the enhanced refinement mode, the general filtering mode or the enhanced filtering mode, namely, the enhanced refinement mode, the general filtering mode and the enhanced filtering mode all belong to a deblocking filtering mode, that is, the enhanced refinement mode, the general filtering mode and the enhanced filtering mode may be sub-modes under the deblocking filtering mode. Based on this, under the deblocking filtering mode, it can be determined to use the enhanced refinement mode or the general filtering mode or the enhanced filtering mode to process the original pixel value of the current pixel point.

Of course, the enhanced refinement mode, the general filtering mode and the enhanced filtering mode may also belong to another type of filtering mode, for example, the SAO filtering mode or the ALF filtering mode, namely, the enhanced refinement mode, the general filtering mode and the enhanced filtering mode may be sub-modes under the SAO filtering mode or sub-modes under the ALF filtering mode. Therefore, under the SAO filtering mode or the ALF filtering mode, it can be determined to use the enhanced refinement mode or the general filtering mode or the enhanced filtering mode to process the original pixel value of the current pixel point.

In some embodiments, for example, the enhanced refinement mode, the general filtering mode and the enhanced filtering mode all belong to the deblocking filtering mode. Thus, the general filtering mode may be referred to as a general mode of the deblocking filtering mode, namely, after the deblocking filtering is performed on the original pixel value of the current pixel point to obtain the filtered pixel value, the deblocking-filtered filtered pixel value is no longer adjusted. The enhanced filtering mode may be referred to as deblocking refinement (DBR) mode, namely, after the deblocking filtering is performed on the original pixel value of the current pixel point to obtain the filtered pixel value, refinement is to be further performed on the deblocking-filtered filtered pixel value. The enhanced refinement mode may be referred to as alternative deblocking refinement (ADBR) mode, namely, without performing deblocking filtering on the original pixel value of the current pixel point, the original pixel value of the current pixel point is directly refined.

Embodiment 6: For the embodiments 1, 2 and 3, the original pixel value of the current pixel point may be refined based on the enhanced refinement mode. The refinement to the original pixel value may include the following steps.

At step S21, based on the original pixel value of the current pixel point and the original pixel value of the surrounding pixel point of the current pixel point, the gradient value of the current pixel point is determined. For example, the gradient value of the current pixel point is determined based on a difference between the original pixel value of the current pixel point and the original pixel value of the surrounding pixel point, which is not limited herein.

At step S22, a reference pixel point corresponding to the current pixel point is determined from a neighboring block of the current block (for the vertical boundary, the neighboring block is the left neighboring block of the current block, and for the horizontal boundary, the neighboring block is the upper neighboring block of the current block), and a gradient value of the reference pixel point is determined based on an original pixel value of the reference pixel point and an original pixel value of a surrounding pixel point of the reference pixel point. For example, the gradient value of the reference pixel point may be determined based on a difference between the original pixel value of the reference pixel point and the original pixel value of the surrounding pixel point of the reference pixel point, which is not limited herein.

In some embodiments, the gradient value of the current pixel point is determined based on the original pixel value of the current pixel point and the original pixel value of the surrounding pixel point of the current pixel point (e.g. the surrounding pixel point is the reference pixel point), and the gradient value of the reference pixel point is determined based on the original pixel value of the surrounding pixel point of the reference pixel point (e.g. the surrounding pixel point is the current pixel point) and the original pixel value of the reference pixel point.

For example, it is assumed that pi indicates the original pixel value of the current pixel point in the current block, that is, the original pixel value of the surrounding pixel point of the reference pixel point, and qi indicates the original pixel value of the reference pixel point in the neighboring block, namely, the original pixel value of the surrounding pixel point of the current pixel point, and in other words, pi and qi respectively indicate original pixel values at both sides of the boundary. The gradient value DPi of the current pixel point pi may be determined in the following manner: DPi=(pi−qi+2)>>2. The gradient value DQi of the reference pixel point qi may be determined in the following manner: DQi=(qi−pi+2)>>2. Certainly, the above is only an example of determining the gradient value of the current pixel point and the gradient value of the reference pixel point, and no limitation is made herein. Apparently, the gradient value of the current pixel point is determined based on the difference between the original pixel value of the current pixel point and the original pixel value of the reference pixel point, and the gradient value of the reference pixel point is determined based on the difference between the original pixel value of the reference pixel point and the original pixel value of the current pixel point.

For example, when the current pixel point pi is p0 (corresponding to R0 in FIG. 3) and the reference pixel point qi is q0 (corresponding to L0 in FIG. 3), the gradient value DP0 of the current pixel point p0 is determined in the following manner: DP0=(p0-q0+2)>>2; the gradient value DQ0 of the reference pixel point q0 is determined in the following manner: DQ0=(q0−p0+2)>>2. DP0=(p0-q0+2)>>2 can be further expressed as DP0=(p0-q0+1)>>1 and DQ0=(q0−p0+2)>>2 can be further expressed as DQ0=(q0−p0+1)>>1.

At step S23, a refined pixel value of the current pixel point is determined based on the gradient value of the current pixel point and the original pixel value of the current pixel point. For example, if the gradient value of the current pixel point is greater than the first refinement threshold, the refined pixel value of the current pixel point is determined based on the original pixel value of the current pixel point and the first refinement offset value (also called the first refinement offset amount). If the gradient value of the current pixel point is less than the second refinement threshold, the refined pixel value of the current pixel point is determined based on the original pixel value of the current pixel point and the second refinement offset value. In some embodiments, the first refinement threshold and the second refinement threshold may be opposite numbers to each other.

At step S24, a refined pixel value of the reference pixel point is determined based on the gradient value of the reference pixel point and the original pixel value of the reference pixel point. For example, if the gradient value of the reference pixel point is greater than the third refinement threshold, the refined pixel value of the reference pixel point is determined based on the original pixel value of the reference pixel point and the third refinement offset value (also called third refinement offset amount). If the gradient value of the reference pixel point is less than the fourth refinement threshold, the refined pixel value of the reference pixel point is determined based on the original pixel value of the reference pixel point and the fourth refinement offset value. In an example, the third refinement threshold and the fourth refinement threshold may be opposite numbers to each other.

For example, if the gradient value DPi of the current pixel point pi is greater than alt_dbr_th (alt_dbr_th represents the first refinement threshold), the refined pixel value Pi of the current pixel point pi may be determined in the following manner: Pi=clip(pi+alt_dbr_offset0), where the alt_dbr_offset0 represents the first refinement offset value. Alternatively, if the gradient value DPi of the current pixel point pi is less than −alt_dbr_th (−alt_dbr_th represents the second refinement threshold), the refined pixel value Pi of the current pixel point pi may be determined in the following manner: Pi=clip(pi+alt_dbr_offset1), where alt_dbr_offset1 represents the second refinement offset value.

In the above embodiment, i may be 0, 1, or 2. For example, i is 0, and in this case, if DP0>dbr_th, then P0=clip(p0+alt_dbr_offset0); if DP0≤dbr_th, then P0=clip(p0+alt_dbr_offset1).

For example, if the gradient value DQi of the reference pixel point qi is greater than alt_dbr_th (alt_dbr_th represents the third refinement threshold and the third refinement threshold is same as the first refinement threshold. In practical applications, the third refinement threshold may be different from the first refinement threshold), the refined pixel value Qi of the reference pixel point qi may be determined in the following manner: Qi=clip(qi+alt_dbr_offset0), where alt_dbr_offset0 represents the third refinement offset value. Here, the third refinement offset value is same as the first refinement offset value. In practical applications, the third refinement offset value may also be different from the first refinement offset value.

Alternatively, if the gradient value DQi of the reference pixel point qi is less than −alt_dbr_th (−alt_dbr_th represents the fourth refinement threshold and the fourth refinement threshold is same as the second refinement threshold. In practical applications, the fourth refinement threshold may be different from the second refinement threshold), the refined pixel value Qi of the reference pixel point qi may be determined in the following manner: Qi=clip(qi+alt_dbr_offset1), where alt_dbr_offset1 represents the fourth refinement offset value. Here, the fourth refinement offset value is same as the second refinement offset value. In practical applications, the fourth refinement offset value may also be different from the second refinement offset value.

In the above embodiment, i may be 0, 1, or 2. For example, when i is 0, if DQ0>dbr_th, then Q0=clip(g0+alt_dbr_offset0); if DQ0≤dbr_th, then Q0=clip(q0+alt_dbr_offset1).

In the above embodiment, pi represents the original pixel point of the current pixel point, DPi represents the gradient value of the current pixel point, Pi represents the refined pixel value of the current pixel point, qi represents the original pixel value of the reference pixel point, DQi represents the gradient value of the reference pixel point, Qi represents the refined pixel value of the reference pixel point. clip(x) represents that x is limited within [0, 2^(bit_depth)-1] (including 0 and 2^(bit_depth)-1), and the bit_depth represents a picture bit depth, and usually, is 8, 10 or 12 or the like.

In one possible implementation, for the decoder, the first refinement threshold, the first refinement offset value, the second refinement offset value, the third refinement threshold, the third refinement offset value and the fourth refinement offset value corresponding to the current block may be parsed out from a high-level syntax. Since the first refinement threshold and the second refinement threshold are opposite numbers to each other, and the third refinement threshold and the fourth refinement threshold are opposite numbers to each other, the decoder may determine the second refinement threshold and the fourth refinement threshold.

In another possible implementation, for the decoder, the first refinement threshold, the first refinement offset value, the second refinement offset value, the fourth refinement threshold, the third refinement offset value and the fourth refinement offset value corresponding to the current block may be parsed out from the high-level syntax. Since the first refinement threshold and the second refinement threshold are opposite numbers to each other, and the third refinement threshold and the fourth refinement threshold are opposite numbers to each other, the decoder may determine the second refinement threshold and the third refinement threshold.

In another possible implementation, for the decoder, the second refinement threshold, the first refinement offset value, the second refinement offset value, the third refinement threshold, the third refinement offset value and the fourth refinement offset value corresponding to the current block may be parsed out from the high-level syntax. Since the first refinement threshold and the second refinement threshold are opposite numbers to each other, and the third refinement threshold and the fourth refinement threshold are opposite numbers to each other, the decoder may determine the first refinement threshold and the fourth refinement threshold.

In another possible implementation, for the decoder, the second refinement threshold, the first refinement offset value, the second refinement offset value, the fourth refinement threshold, the third refinement offset value and the fourth refinement offset value corresponding to the current block may be parsed out from the high-level syntax. Since the first refinement threshold and the second refinement threshold are opposite numbers to each other, and the third refinement threshold and the fourth refinement threshold are opposite numbers to each other, the decoder may determine the first refinement threshold and the third refinement threshold.

In another possible implementation, for the decoder, the first refinement threshold (or the second refinement threshold, or the third refinement threshold, or the fourth refinement threshold, namely, other three refinement thresholds can be derived from one refinement threshold), the first refinement offset value (or the third refinement offset value), the second refinement offset value (or the fourth refinement offset value) corresponding to the current block may be parsed out from the high-level syntax. Therefore, since the first refinement threshold and the second refinement threshold are opposite numbers to each other, the second refinement threshold can be determined. Since the first refinement threshold and the third refinement threshold are same, the third refinement threshold can be determined. Since the third refinement offset value and the first refinement offset value are same, the third refinement offset value can be determined. Since the fourth refinement offset value and the second refinement offset value are same, the fourth refinement offset value can be determined. Since the third refinement threshold and the fourth refinement threshold are opposite numbers to each other, the fourth refinement threshold can be determined.

Certainly, the above are only several examples which are not limited herein as long as the decoder can obtain the first refinement threshold, the second refinement threshold, the third refinement threshold, the fourth refinement threshold, the first refinement offset value, the second refinement offset value, the third refinement offset value and the fourth refinement offset value. The above values can be obtained by analysis or derivation.

In the above embodiment, the high-level syntax includes but not limited to one of the following syntaxes: a SPS high-level syntax, a PPS high-level syntax, a picture header high-level syntax, a picture high-level syntax; a slice header high-level syntax, a CTU high-level syntax, and a CU high-level syntax. Certainly, the above are only several examples of the high-level syntaxes and the types of the high-level syntaxes are not limited herein as long as the refinement thresholds and the refinement offset values corresponding to the current block can be carried by the high-level syntaxes.

In the above embodiments, the pixel value of the current pixel point in the current block may be a luma component or a chroma component.

In one possible implementation, an enhanced refinement mode enable flag represents whether to enable the enhanced refinement mode. If the enhanced refinement mode enable flag allows the current block to enable the enhanced refinement mode, it is required to determine whether the current pixel point in the current block satisfies the enable condition of the enhanced refinement mode. If the current pixel point satisfies the enable condition of the enhanced refinement mode, the original pixel value of the current pixel point is refined based on the enhanced refinement mode. If the enhanced refinement mode enable flag disallows the current block to enable the enhanced refinement mode, it is directly determined that each pixel point in the current block does not satisfy the enable condition of the enhanced refinement mode and the original pixel value of the current pixel point is not adjusted based on the enhanced refinement mode. Therefore, if the enhanced refinement mode enable flag corresponding to the current block allows the current block to enable the enhanced refinement mode, it is determined that whether the current pixel point in the current block satisfies the enable condition of the enhanced refinement mode. If the enhanced refinement mode enable flag corresponding to the current block disallows the current block to enable the enhanced refinement mode, it is determined that each pixel point in the current block does not satisfy the enable condition of the enhanced refinement mode.

In some embodiments, for the decoder, the enhanced refinement mode enable flag corresponding to the current block may be parsed out from the high-level syntax. For example, if the enhanced refinement mode enable flag is a first value (e.g. 1), it indicates that the enhanced refinement mode enable flag allows the current block to enable the enhanced refinement mode; if the enhanced refinement mode enable flag is a second value (e.g. 0), it indicates that the enhanced refinement mode enable flag disallows the current block to enable the enhanced refinement mode.

In the above embodiment, the high-level syntax includes but not limited to one of the following syntaxes: an SPS high-level syntax, a PPS high-level syntax, a picture header high-level syntax, a picture high-level syntax; a slice header high-level syntax, a CTU high-level syntax, and a CU high-level syntax. Certainly, the above are only several examples of the high-level syntaxes and the types of the high-level syntaxes are not limited herein as long as the enhanced refinement mode enable flag corresponding to the current block can be carried by the high-level syntaxes.

Embodiment 7: for the embodiments 1 and 5, the original pixel value of the current pixel point may be refined based on the enhanced filtering mode. The refinement to the original pixel value of the current pixel point may include the following steps.

At step S31, deblocking filtering is performed on the original pixel value of the current pixel point to obtain a filtered pixel value of the current pixel point.

At step S32, a reference pixel point corresponding to the current pixel point is determined from a neighboring block of the current block (for the vertical boundary, the neighboring block is the left neighboring block of the current block, and for the horizontal boundary, the neighboring block is the upper neighboring block of the current block), and deblocking filtering is performed on an original pixel value of the reference pixel point to obtain a filtered pixel value of the reference pixel point.

In some embodiments, deblocking filtering is performed on the original pixel value of the current pixel point based on the deblocking filtering (DBF) to obtain the filtered pixel value of the current pixel point; and deblocking filtering is performed on the original pixel value of the reference pixel point based on the DBF to obtain the filtered pixel value of the reference pixel point. Of course, filtering may also be performed on the original pixel value of the current pixel point based on the SAO to obtain the filtered pixel value of the current pixel point, and filtering is performed on the original pixel value of the reference pixel point based on the SAO to obtain the filtered pixel value of the reference pixel point. Alternatively, filtering may be performed on the original pixel value of the current pixel point based on the ALF to obtain the filtered pixel value of the current pixel point, and filtering is performed on the original pixel value of the reference pixel point based on the ALF to obtain the filtered pixel value of the reference pixel point. For ease of descriptions, in subsequent embodiments, for example, deblocking filtering is performed on the original pixel value of the current pixel point and the reference pixel point based on the DBF.

With reference to FIG. 3, based on the position of the current pixel point, horizontal DBF filtering may be performed only on the current pixel point and the reference pixel point, or vertical DBF filtering is performed only on the current pixel point and the reference pixel point, or vertical DBF filtering is performed on the current pixel point and the reference pixel point firstly and horizontal DBF filtering is then performed on the current pixel point and the reference pixel point.

At step S33, based on the filtered pixel value of the current pixel point and the original pixel value of the current pixel point, a refined pixel value of the current pixel point is determined. For example, based on the filtered pixel value of the current pixel point, the original pixel value of the current pixel point, the first filtering threshold, the second filtering threshold, the first filtering offset value and the second filtering offset value, the refined pixel value of the current pixel point is determined. The first filtering threshold and the second filtering threshold may be opposite numbers to each other.

At step S34, based on the filtered pixel value of the reference pixel point and the original pixel value of the reference pixel point, a refined pixel value of the reference pixel point is determined. For example, based on the filtered pixel value of the reference pixel point, the original pixel value of the reference pixel point, the third filtering threshold, the fourth filtering threshold, the third filtering offset value and the fourth filtering offset value, the refined pixel value of the reference pixel point is determined. The third filtering threshold and the fourth filtering threshold may be opposite numbers to each other.

In some embodiments, if the current pixel point only satisfies the enable condition of the general filtering mode but does not satisfy the enable condition of the enhanced filtering mode, the steps S31 and S32 are performed to take the filtered pixel value as the target pixel value (the final pixel value of the deblocking filtering process). If the current pixel point satisfies both the enable condition of the general filtering mode and the enable condition of the enhanced filtering mode, the steps S31 to S34 are performed to take the refined pixel value as the target pixel value (the final pixel value of the deblocking filtering process).

In steps S33 and S34, enhanced filtering processing may be performed on the original pixel value of the pixel point based on the filtered pixel value and the unfiltered original pixel value, namely, enhanced filtering processing is performed on the original pixel value of the pixel point to obtain an enhanced-filtered refined pixel value, such that the enhanced-filtered refined pixel value is closer to the real pixel than the filtered pixel value. Therefore, it is avoided that the filtered pixel value is far greater than or far less than the real pixel of the pixel point due to over-filtering, thus improving the picture quality.

In some embodiments, for the step S33, if a difference between the filtered pixel value of the current pixel point and the original pixel value of the current pixel point is greater than the first filtering threshold, the refined pixel value of the current pixel point may be determined based on the filtered pixel value of the current pixel point, the original pixel value of the current pixel point, and the first filtering offset value. If the difference between the filtered pixel value of the current pixel point and the original pixel value of the current pixel point is less than the second filtering threshold, the refined pixel value of the current pixel point may be determined based on the filtered pixel value of the current pixel point, the original pixel value of the current pixel point, and the second filtering offset value.

For example, it assumed that $Y_1(i)$ represents the original pixel value of the current pixel point, $Y_2(i)$ represents the filtered pixel value of the current pixel point, $Y_3(i)$ represents the refined pixel value of the current pixel point, and $Yv(i)=(Y_1(i)+Y_2(i)+1)>>1$.

Thus, if $Y_1(i)-Y_2(i)>T_v$, then $Y_3(i)=Clip(Y_v(i)+f0_v)$; if $Y_1(i)-Y_2(i)<NT_v$, then $Y_3(i)=Clip(Y_v(i)+f1_v)$. In the above formulas, $T_v$ represents the first filtering threshold, $f0_v$ represents the first filtering offset value, $NT_v$ represents the second filtering threshold, $f1_v$ represents the second filtering offset value, $NT_v$ is generally set to $-T_v$ or another value, clip(x) represents x is limited within the predetermined value range, which generally is $[0, 2^D-1]$, where D is a picture bit depth. For an 8-bit picture, the range is [0, 255], and for a 10-bit picture, the range is [0, 1023].

In order to prevent the enhanced-filtered refined pixel value from exceeding the pixel value range, when the refined pixel value is obtained, the refined pixel value may be clipped to the predetermined value range by a Clip operation. When the refined pixel value is greater than an upper limit of the predetermined value range, the refined pixel value is set to the upper limit of the predetermined value range; when the refined pixel value is less than a lower limit of the predetermined value range, the refined pixel value is set to the lower limit of the predetermined value range. For example, for an 8-bit picture, when the refined pixel value is less than 0, the refined pixel value is set to 0; when the refined pixel value is greater than 255, the refined pixel value is set to 255.

In some embodiments, for the step S34, if the difference between the filtered pixel value of the reference pixel point and the original pixel value of the reference pixel point is greater than the third filtering threshold, the refined pixel value of the reference pixel point is determined based on the filtered pixel value of the reference pixel point, the original pixel value of the reference pixel point, and the third filtering offset value. If the difference between the filtered pixel value of the reference pixel point and the original pixel value of the reference pixel point is less than the fourth filtering threshold, the refined pixel value of the reference pixel point is determined based on the filtered pixel value of the reference pixel point, the original pixel value of the reference pixel point, and the fourth filtering offset value. The way of determining the refined pixel value of the reference pixel point is similar to that of determining the refined pixel value of the current pixel point and will not be repeated herein.

In some embodiments, the third filtering threshold and the first filtering threshold may be same or different; the third filtering offset value and the first filtering offset value may be same or different; the fourth filtering threshold and the second filtering threshold may be same or different; and the fourth filtering offset value and the second filtering offset value may be same or different.

In one possible implementation, for the decoder, the first filtering threshold, the first filtering offset value, the second filtering offset value, the third filtering threshold, the third filtering offset value and the fourth filtering offset value corresponding to the current block may be parsed out from the high-level syntax. Since the first filtering threshold and the second filtering threshold are opposite numbers to each other, and the third filtering threshold and the fourth filtering threshold are opposite numbers to each other, the decoder may determine the second filtering threshold and the fourth filtering threshold.

In another possible implementation, for the decoder, the first filtering threshold, the first filtering offset value, the second filtering offset value, the fourth filtering threshold, the third filtering offset value and the fourth filtering offset value corresponding to the current block may be parsed out from the high-level syntax. Since the first filtering threshold and the second filtering threshold are opposite numbers to each other, and the third filtering threshold and the fourth filtering threshold are opposite numbers to each other, the decoder may determine the second filtering threshold and the third filtering threshold.

In another possible implementation, for the decoder, the second filtering threshold, the first filtering offset value, the second filtering offset value, the third filtering threshold, the third filtering offset value and the fourth filtering offset value corresponding to the current block may be parsed out from the high-level syntax. Since the first filtering threshold and the second filtering threshold are opposite numbers to each other, and the third filtering threshold and the fourth filtering threshold are opposite numbers to each other, the decoder may determine the first filtering threshold and the fourth filtering threshold.

In one possible implementation, for the decoder, the second filtering threshold, the first filtering offset value, the second filtering offset value, the fourth filtering threshold, the third filtering offset value and the fourth filtering offset value corresponding to the current block may be parsed out from the high-level syntax. Since the first filtering threshold and the second filtering threshold are opposite numbers to each other, and the third filtering threshold and the fourth filtering threshold are opposite numbers to each other, the decoder may determine the first filtering threshold and the third filtering threshold.

In another possible implementation, for the decoder, the first filtering threshold (or the second filtering threshold, or the third filtering threshold, or the fourth filtering threshold, namely, other three filtering thresholds can be derived from one filtering threshold), the first filtering offset value (or the third filtering offset value), the second filtering offset value (or the fourth filtering offset value) corresponding to the current block may be parsed out from the high-level syntax. Therefore, since the first filtering threshold and the second filtering threshold are opposite numbers to each other, the second filtering threshold can be determined. Since the first filtering threshold and the third filtering threshold are same, the third filtering threshold can be determined. Since the third filtering offset value and the first filtering offset value are same, the third filtering offset value can be determined. Since the fourth filtering offset value and the second filtering offset value are same, the fourth filtering offset value can be determined. Since the third filtering threshold and the fourth filtering threshold are opposite numbers to each other, the fourth filtering threshold can be determined.

Certainly, the above are only several examples which are not limited herein as long as the decoder can obtain the first filtering threshold, the second filtering threshold, the third filtering threshold, the fourth filtering threshold, the first filtering offset value, the second filtering offset value, the third filtering offset value and the fourth filtering offset value. The above values can be obtained by analysis or derivation.

In the above embodiment, the high-level syntax includes but not limited to one of the following syntaxes: an SPS high-level syntax, a PPS high-level syntax, a picture header high-level syntax, a picture high-level syntax; a slice header high-level syntax, a CTU high-level syntax, and a CU high-level syntax. Certainly, the above are only several examples of the high-level syntaxes and the types of the high-level syntaxes are not limited herein as long as the filtering thresholds and the filtering offset values corresponding to the current block can be carried by the high-level syntaxes.

In the above embodiment, the pixel value of the current pixel point in the current block may be a luma component or a chroma component.

In one possible implementation, an enhanced filtering mode enable flag represents whether to enable the enhanced filtering mode. If the enhanced filtering mode enable flag allows the current block to enable the enhanced filtering mode, it is required to determine whether the current pixel point in the current block satisfies the enable condition of the enhanced filtering mode. If the current pixel point satisfies the enable condition of the enhanced filtering mode, the original pixel value of the current pixel point is refined based on the enhanced filtering mode. If the enhanced filtering mode enable flag disallows the current block to enable the enhanced filtering mode, it is directly determined that each pixel point in the current block does not satisfy the enable condition of the enhanced filtering mode and the original pixel value of the current pixel point is not adjusted based on the enhanced filtering mode. Therefore, if the enhanced filtering mode enable flag corresponding to the current block allows the current block to enable the enhanced filtering mode, it is determined that whether the current pixel point in the current block satisfies the enable condition of the enhanced filtering mode. If the enhanced filtering mode enable flag corresponding to the current block disallows the current block to enable the enhanced filtering mode, it is determined that each pixel point in the current block does not satisfy the enable condition of the enhanced filtering mode.

For example, for the decoder, the enhanced filtering mode enable flag corresponding to the current block may be parsed out from the high-level syntax. For example, if the enhanced filtering mode enable flag is a first value (e.g. 1), it indicates that the enhanced filtering mode enable flag allows the current block to enable the enhanced filtering mode; if the enhanced filtering mode enable flag is a second value (e.g. 0), it indicates that the enhanced filtering mode enable flag disallows the current block to enable the enhanced filtering mode.

In the above embodiment, the high-level syntax includes but not limited to one of the following syntaxes: an SPS high-level syntax, a PPS high-level syntax, a picture header high-level syntax, a picture high-level syntax; a slice header high-level syntax, a CTU high-level syntax, and a CU high-level syntax. Certainly, the above are only several examples of the high-level syntaxes and the types of the high-level syntaxes are not limited herein as long as the enhanced filtering mode enable flag corresponding to the current block can be carried by the high-level syntaxes.

Embodiment 8: when the enable condition of the general filtering mode is satisfied, deblocking filtering may be performed on the original pixel value of the pixel point based on the DBF filtering mode (deblocking filtering mode). Since the DBF filtering includes a vertical DBF filtering and a horizontal DBF filtering, deblocking filtering may be performed on the original pixel value of the pixel point in the following steps.

At step 1, the filtered pixel value $Y_2(i)$ is obtained by performing vertical DBF filtering on the original pixel value $Y_1(i)$.

At step 2, the filtered pixel value $Y_3(i)$ is obtained by performing horizontal DBF filtering on the pixel value $Y_2(i)$.

In some embodiments, if only the vertical DBF filtering is performed on the pixel point, only the step 1 is performed to obtain the filtered pixel value of the pixel point; if only the horizontal DBF filtering is performed on the pixel point, only the step 2 is performed to obtain the filtered pixel value of the pixel point, where the pixel value $Y_2(i)$ of the step 2 is replaced with the original pixel value of the pixel point. If the vertical DBF filtering is performed firstly on the pixel point and then the horizontal DBF filtering is performed on the pixel point, the steps 1 and 2 are performed sequentially.

When the enable condition of the general filtering mode and the enable condition of the enhanced filtering mode are both satisfied, deblocking filtering may be performed on the original pixel value of the pixel point based on the DBF filtering mode (deblocking filtering) and then the deblocking-filtered filtered pixel value is refined. Since the DBF filtering includes the vertical DBF filtering and the horizontal DBF filtering, deblocking filtering may be performed on the original pixel value of the pixel point and the deblocking-filtered filtered pixel value is refined in the following steps.

At step 1, the filtered pixel value $Y_2(i)$ is obtained by performing vertical DBF filtering on the original pixel value $Y_1(i)$.

At step 2, the refined pixel value $Y_3(i)$ is obtained based on $Y_2(i)-Y_1(i)$.

At step 3, the filtered pixel value $Y_4(i)$ is obtained by performing horizontal DBF filtering on the pixel value $Y_3(i)$.

At step 4, the refined pixel value $Y_5(i)$ is obtained based on $Y_4(i)-Y_3(i)$.

In some embodiments, if only the vertical DBF filtering is performed on the pixel point, only the steps 1 and 2 are performed to obtain the refined pixel value of the pixel point. If only the horizontal DBF filtering is performed on the pixel point, only the steps 3 and 4 are performed to obtain the refined pixel value of the pixel point, where the pixel value $Y_3(i)$ of the step 3 is replaced with the original pixel value of the pixel point. If the vertical DBF filtering is firstly performed on the pixel point and then the horizontal DBF filtering is performed on the pixel point, the steps 1, 2, 3, and 4 are performed sequentially. If the horizontal DBF filtering is firstly performed on the pixel point and then the vertical DBF filtering is performed on the pixel point, the steps are similar and will not be repeated herein.

In some embodiments, the steps 2 and 4 are a processing procedure of the enhanced filtering mode when the enable condition of the enhanced filtering mode is satisfied, namely, a process of adjusting the filtered pixel value to obtain the refined pixel value.

In step 2, it is assumed that $Y_v(i)=(Y_1(i)+Y_2(i)+1)>>1$. If $Y_1(i)-Y_2(i)>T_v$, then $Y_3(i)=\text{Clip}(Y_v(i)+f0_v)$; if $Y_1(i)-Y_2(i)<NT_v$, then $Y_3(i)=\text{Clip}(Y_v(i)+f1_v)$, and otherwise, $Y_3(i)=Y_2(i)$ (in one embodiment, in this case, $Y_3(i)$ may be obtained by filtering $Y_2(i)$, for example, $Y_3(i)=Y_2(i)+f2$).

In some embodiments, clip(x) represents that x is limited within a predetermined picture value range which usually is $[0, 2^D-1]$, where D is a picture bit depth. For an 8-bit picture, the picture value range may be [0, 255]; for a 10-bit picture, the picture value range is [0, 1023]. The threshold $NT_v$ usually is set to $-T_v$ or another value.

Similar to the step 2, in the step 4, assuming that $Y_h(i)=(Y_3(i)+Y_4(i)+1)>>1$, if $Y_4(i)-Y_3(i)>T_h$, then $Y_5(i)=\text{Clip}(Y_h(i)+f0_h)$; if $Y_1(i)-Y_2(i)<NT_h$, then $Y_5(i)=\text{Clip}(Y_h(i)+f1_h)$, and otherwise, $Y_5(i)=Y_4(i)$ (in one embodiment, in this case, $Y_5(i)$ may be obtained by filtering $Y_4(i)$, for example, $Y_5(i)=Y_4(i)+f2_h$), where $NT_h$ usually is set to $-T_h$ or another value.

In the above embodiment, $T_v$ and $NT_v$ represent filtering thresholds, f0v, f1v and f2v represent filtering offset values, and clip(x) represents x is limited within the predetermined value range. For example, $T_v$ refers to the above first filtering threshold and third filtering threshold (for example, the first filtering threshold and the third filtering threshold are same), NTv refers to the above second filtering threshold and fourth filtering threshold (for example, the second filtering threshold and the fourth filtering threshold are same), f0v refers to the above first filtering offset value and third filtering offset value (for example, the first filtering offset value and the third filtering offset value are same), and f1v refers to the above second filtering offset value and fourth filtering offset value (for example, the second filtering offset value and the fourth filtering offset value are same). NTv=−Tv, where Tv and NTv are opposite numbers to each other.

In the above embodiment, Th and NTh are filtering thresholds, f0h, f1h and f2h are filtering offset values, and clip(x) represents that x is limited within the predetermined value range. For example, Th refers to the above first filtering threshold and third filtering threshold (for example, the first filtering threshold and the third filtering threshold are same), NTh refers to the above second filtering threshold and fourth filtering threshold (for example, the second filtering threshold and the fourth filtering threshold are same), f0h refers to the above first filtering offset value and third filtering offset value (for example, the first filtering offset value and the third filtering offset value are same), and f1h refers to the above second filtering offset value and fourth filtering offset value (for example, the second filtering offset value and the fourth filtering offset value are same). NTh=−Th, where Th and NTh are opposite numbers to each other.

Embodiment 9: in the DBF, if filtering is performed based only on an established rule, there will be overfiltering or underfiltering. For example, if a reconstruction value before the DBF is Y1, and the pixel value after the DBF is Y2, classification may be performed based on Y2-Y1. Classification based on filtering residual has the following major advantages: special enhancement may be performed on some pixel values subjected to overfiltering or pseudo-filtering to realize the pixels of these classes are closer to the original value. The overfiltering refers to that Y2 is far greater than (or far less than) Y1 and thus Y2 is far greater than (or far less than) the original pixel value. The pseudo-filtering refers to that Y2-Y1 is 0 or close to 0, namely, these pixel values remain unchanged after being filtered, failing to achieve the filtering effect. For the above discovery, in the present embodiment, the pixel value of the pixel point may be refined based on the enhanced refinement mode, namely, if the enhanced refinement mode is enabled for the current pixel point in the current block, the original pixel value of the current pixel point is refined based on the enhanced refinement mode rather than on the general filtering mode or the enhanced filtering mode.

In one possible implementation, the refinement process of the original pixel value may include the following steps.

At step 1, the filtered pixel value $Y_2$ (i) is obtained by performing vertical DBF filtering on the original pixel value $Y_1$(i).

At step 2, the refined pixel value $Y_3$(i) is obtained based on $Y_2$(i)−$Y_1$(i).

At step 3, the filtered pixel value $Y_4$(i) is obtained by performing horizontal DBF filtering on the pixel value $Y_3$ (i).

At step 4, the refined pixel value $Y_5$(i) is obtained based on $Y_4$(i)−$Y_3$(i).

In the step 2, there are the following two cases: abs($Y_2$ (i)−$Y_1$(i))<the threshold and abs($Y_2$(i)−$Y_1$(i)) is not less than the threshold. If abs($Y_2$(i)−$Y_1$(i))<the threshold, there may be further the following two cases: BS is 0 and BS is greater than 0. In some embodiments, the threshold may be the above first filtering threshold or second filtering threshold, where, for example, the first filtering threshold and the second filtering threshold are opposite numbers to each other. If the first filtering threshold is a positive value, the threshold may be the first filtering threshold; if the second filtering threshold is a positive value, the threshold may be the second filtering threshold.

In conclusion, the refinement process of the original pixel value may include the following three cases.

Case 1: when the BS is 0, no filtering is performed (i.e. $Y_2$ (i) is equal to $Y_1$(i), which is equivalent to not performing vertical DBF filtering on the original pixel value $Y_1$(i), namely, not performing the step 1), but, the original pixel value $Y_1$(i) may be refined based on the enhanced refinement mode to obtain the refined pixel value.

Case 2: when the BS is greater than 0 and abs($Y_2$(i)−$Y_1$(i))<the threshold, filtering may be performed (i.e. performing vertical DBF filtering on the original pixel value $Y_1$(i), namely, performing the step 1). On the basis of performing the step 1, the filtered pixel value $Y_2$ (i) may be refined based on the enhanced filtering mode to obtain the refined pixel value $Y_3$ (i) of the pixel point.

Case 3: when the BS is greater than 0 and abs($Y_2$(i)−$Y_1$(i)) is not less than the threshold, filtering may be performed (i.e. performing vertical DBF filtering on the original pixel value $Y_1$(i), namely, performing the step 1). On the basis of performing the step 1, the filtered pixel value $Y_2$(i) is no longer refined based on the enhanced filtering mode, namely, the step 2 is no longer is performed, that is, $Y_3$ (i)=$Y_2$ (i).

In step 4, there are the following two cases: abs(Y4(i)−Y3(i))<the threshold, and abs(Y4(i)−Y3(i)) is not less than the threshold. If abs(Y4(i)−Y3(i))<the threshold, there may be further the following two cases: the BS is equal to 0 and the BS is greater than 0.

In conclusion, the refinement process of the original pixel value may include the following three cases.

Case 1: when the BS is 0, no filtering is performed (i.e. $Y_4$(i) is equal to $Y_3$ (i), which is equivalent to not performing horizontal DBF filtering on the original pixel value $Y_3$ (i), namely, not performing the step 3), but, the original pixel value $Y_3$(i) may be refined based on the enhanced refinement mode to obtain the refined pixel value.

Case 2: when the BS is greater than 0 and abs(Y4(i)−Y3(i))<the threshold, filtering may be performed (i.e. performing horizontal DBF filtering on the original pixel value $Y_3$(i), namely, performing the step 3). On the basis of performing the step 3, the filtered pixel value $Y_4$(i) of the pixel point may be refined based on the enhanced filtering mode to obtain the refined pixel value $Y_5$ (i) of the pixel point.

Case 3: when the BS is greater than 0 and abs(Y4(i)−Y3(i)) is not less than the threshold, filtering may be performed (i.e. performing horizontal DBF filtering on the original pixel value $Y_3$ (i), namely, performing the step 3). On the basis of performing the step 3, the filtered pixel value $Y_4$(i) is no longer adjusted based on the enhanced filtering mode, namely, the step 4 is no longer is performed, that is, $Y_5$(i)=$Y_4$(i).

In conclusion, if the BS is 0, processing is performed based on the enhanced refinement mode, namely, filtering may not be performed, that is, $Y_2$ (i)=$Y_1$(i) and $Y_4$ (i)=$Y_3$ (i). On this basis, $Y_1$(i) may be refined based on the enhanced refinement mode, and $Y_3$ (i) may also be refined based on the enhanced refinement mode. Therefore, the DBF filtering may be performed in the following steps.

At step 1, the filtered pixel value $Y_2$ (i) is obtained by performing vertical DBF filtering on the original pixel value $Y_1$(i).

At step 2, if the BS is 0, $Y_1$(i) is refined based on the enhanced refinement mode to obtain the refined pixel value $Y_3$(i). If the BS is greater than 0, and abs($Y_2$(i)−$Y_1$(i))<the threshold, the enhanced filtering mode is enabled to obtain the refined pixel value $Y_3$ (i) based on $Y_2$ (i)−$Y_1$(i), as shown in the step 2 of the embodiment 8. If the BS is greater than 0 and abs($Y_2$(i)−$Y_1$(i)) is not less than the threshold, the general filtering mode is enabled to no longer perform refinement on the filtered pixel value $Y_2$ (i), namely $Y_3$ (i)=$Y_2$ (i).

In some embodiments, if the BS is 0, the step is actually not performed, namely, it is not required to obtain the filtered pixel value $Y_2$ (i).

At step 3, the filtered pixel value $Y_4(i)$ is obtained by performing horizontal DBF filtering on the pixel value $Y_3$ (i).

At step 4, if the BS is 0, refinement is performed on $Y_3(i)$ based on the enhanced refinement mode to obtain the refined pixel value $Y_5(i)$. If the BS is grater than 0 and abs($Y_4(i)-Y_3(i)$))<the threshold, the enhanced filtering mode is enabled to obtain the refined pixel value $Y_5$ (i) based on $Y_4(i)-Y_3$ (i), as shown in the step 4 of the embodiment 8. If the BS is greater than 0 and abs($Y_4(i)-Y_3(i)$)) is not less than the threshold, the general filtering mode is enabled to no longer perform refinement on the filtered pixel value $Y_4(i)$, namely, $Y_5(i)=Y_4(i)$.

In some embodiments, if the BS is 0, the step 3 is actually not performed, namely, it is not required to obtain the filtered pixel value $Y_4(i)$.

In another possible implementation, if the BS is greater than 0, filtering is performed but abs($Y_2(i)-Y_1(i)$))<the threshold after filtering. In this case, the enhanced filtering mode is used for the processing, namely, the DBF filtering may be performed in the following steps.

At step 1, the filtered pixel value $Y_2$ (i) is obtained by performing vertical DBF filtering on the original pixel value $Y_1(i)$.

At step 2, if the BS is greater than 0, when abs($Y_2(i)-Y_1$ (i))<the threshold is still satisfied after the vertical DBF filtering is performed on $Y_1(i)$, the refined pixel value $Y_3(i)$ is obtained based on the enhanced filtering mode. For example, $Y_3(i)$ is obtained by $Y_1(i)$ plus a compensation value. Otherwise, if abs($Y_2(i)-Y_1(i)$) is not less than the threshold, $Y_3$ (i)=$Y_2$ (i).

At step 3, the filtered pixel value $Y_4(i)$ is obtained by performing horizontal DBF filtering on the pixel value $Y_3$ (i).

At step 4, if the BS is greater than 0, when abs($Y_4(i)-Y_3$ (i))<the threshold is still satisfied after the horizontal DBF filtering is performed on $Y_3(i)$, the refined pixel value $Y_5(i)$ is obtained based on the enhanced filtering mode. For example, $Y_5(i)$ is obtained by $Y_3(i)$ plus a compensation value. Otherwise, if abs($Y_4(i)-Y_3(i)$) is not less than the threshold, then $Y_5(i)=Y_4(i)$.

Embodiment 10: for the embodiment 9, if the BS is 0, $Y_1(i)$ is refined based on the enhanced refinement mode to obtain the refined pixel value $Y_3$ (i). The specific refinement process can be achieved in the following steps. If the BS is 0, $Y_3$ (i) is refined based on the enhanced refinement mode to obtain the refined pixel value $Y_5$ (i). The process is similar to the process of obtaining the refined pixel value $Y_3(i)$, and thus will not repeated herein.

Firstly, a gradient value of $Y_1(i)$ is determined, where $Y_1(i)$ may be an original pixel value of the current pixel point or an original pixel value of the reference pixel point. For the vertical boundary, a horizontal gradient value $DY_1(i)$ of $Y_1(i)$ may be calculated; for the horizontal boundary, a vertical gradient value $DY_1(i)$ of $Y_1(i)$ may be calculated. For example, if pi and qi respectively represents the original pixel value of the current pixel point and the original pixel value of the reference pixel point (corresponding to $Y_1(i)$), the gradient value DP0 of the original pixel value pi of the current pixel point is calculated in the following formula: DP0=(pi−qi+2)>>2; the gradient value DQ0 of the original pixel value qi of the reference pixel point is calculated in the following formula: DQ0=(qi−pi+2)>>2.

Next, based on the size of $DY_1(i)$, $Y_3$ (i) is obtained by compensation refinement. For example, the refined pixel value Pi corresponding to the original pixel value pi of the current pixel point is determined in the following manner: if DPi>alt_dbr_th, then Pi=clip(pi+alt_dbr_offset0); if DPi←−alt_dbr_th, then Pi=clip(pi+alt_dbr_offset1), where i is 0, 1, 2 or the like. The refined pixel value Qi corresponding to the original pixel value qi of the reference pixel point is determined in the following manner: if DQi>alt_dbr_th, then Qi=clip(qi+alt_dbr_offset0); if DQi←−alt_dbr_th, then Qi=clip(qi+alt_dbr_offset1), where i is 0, 1, or 2.

In the above formulas, alt_dbr_th refers to the first refinement threshold and the third refinement threshold (for example, the third refinement threshold and the first refinement threshold are same), alt_dbr_offset0 refers to the first refinement offset value and the third refinement offset value (for example, the first refinement offset value and the third refinement offset value are same), alt_dbr_offset1 refers to the second refinement offset value and the fourth refinement offset value (for example, the second refinement offset value and the fourth refinement offset value are same), −alt_dbr_th refers to the second refinement threshold and the fourth refinement threshold (for example, the second refinement threshold and the fourth refinement threshold are same), and −alt_dbr_th and alt_dbr_th are opposite numbers to each other.

Embodiment 11: the enhanced refinement mode is controlled to be enabled by a high-level syntax (e.g. the SPS-level high syntax). For example, in a sequence header, a flag adbr_enable_flag is encoded/decoded, namely, the encoder encodes the flag adbr_enable_flag in the sequence header and the decoder decodes the flag adbr_enable_flag in the sequence header. adbr_enable_flag is a binary variable, where the value "1" indicates the enhanced refinement mode is available, and the value "0" indicates the enhanced refinement mode is unavailable. The value of AdbrEnableFlag is equal to adbr_enable_flag. If there is no adbr_enable_flag in the bit stream, the value of AdbrEnableFlag is 0.

In conclusion, for the decoder, the enhanced refinement mode enable flag (i.e. AdbrEnableFlag) corresponding to the current block may be parsed out from the high-level syntax. If the value of the enhanced refinement mode enable flag is 1, it indicates that the enhanced refinement mode enable flag allows the current block to enable the enhanced refinement mode; if the value of the enhanced refinement mode enable flag is 0, it indicates that the enhanced refinement mode enable flag disallows the current block to enable the enhanced refinement mode.

Embodiment 12: the enhanced filtering mode and the enhanced refinement mode are simultaneously controlled to be enabled by a high-level syntax (e.g. the SPS high-level syntax). For example, in a sequence header, a flag dbr_enable_flag is encoded/decoded, namely, the encoder encodes the flag dbr_enable_flag in the sequence header and the decoder decodes the flag dbr_enable_flag in the sequence header.

dbr_enable_flag is a binary variable, where the value "1" indicates the use of the enhanced filtering mode and the enhanced refinement mode is allowed, and the value "0" indicates the use of the enhanced filtering mode and the enhanced refinement mode is disallowed. The value of DbrEnableFlag is equal to dbr_enable_flag. If there is no dbr_enable_flag in a bit stream, the value of DbrEnableFlag is 0.

In conclusion, for the decoder, an enhanced filtering mode enable flag and an enhanced refinement mode enable flag (i.e. DbrEnableFlag, which is used as the enhanced filtering mode enable flag and the enhanced refinement mode enable flag at the same time) corresponding to the current block may be parsed out from the high-level syntax. If the value of DbrEnableFlag is 1, it indicates that the current block is allowed to enable the enhanced filtering mode and the enhanced refinement mode; if the value of DbrEnableFlag is 0, it indicates that the current block is disallowed to enable the enhanced filtering mode and the enhanced refinement mode.

Embodiment 13: Reference may be made to Table 1 for one expression of the high-level syntax (e.g. the picture header high-level syntax), for example, a syntax shown by the picture header encoding/decoding table 1. The encoder encodes, in the picture header, the syntaxes shown in table 1, and the decoder decodes, in the picture header, the syntaxes shown in Table 1.

TABLE 1

```
picture_dbr_v_enable_flag
if (PictureDbrVEnableFlag) {
    dbr_v_threshold_minus1
    dbr_v_offset0_minus1
    dbr_v_offset1_minus1
    dbr_v_alt_offset0_minus1
    dbr_v_alt_offset1_minus1
}
picture_dbr_h_enable_flag
if (PictureDbrHEnableFlag) {
    dbr_h_threshold_minus1
    dbr_h_offset0_minus1
    dbr_h_offset1_minus1
    dbr_v_alt_offset0_minus1
    dbr_v_alt_offset1_minus1
}
```

In Table 1, the meanings of relevant syntaxes are described below.

The picture-level deblocking filtering vertical refinement enable flag is represented as picture_dbr_v_enable_flag which is a binary variable, where the value "1" indicates the current picture allows using the deblocking filtering vertical refinement, and the value "0" indicates the current picture disallows using the deblocking filtering vertical refinement. The value of PictureDbrVEnableFlag is equal to the value of picture_dbr_v_enable_flag. If there is no picture_dbr_v_enable_flag in a bit stream, the value of PhDbrVEnableFlag is 0.

In some embodiments, for the enhanced refinement mode, PictureDbrVEnableFlag corresponds to the enhanced refinement mode enable flag and is the enhanced refinement mode enable flag for the vertical DBF filtering. In other words, when the vertical DBF filtering is to be performed, PictureDbrVEnableFlag indicates allowing enabling the enhanced refinement mode or disallowing enabling the enhanced refinement mode.

In some embodiments, for the enhanced filtering mode, PictureDbrVEnableFlag corresponds to the enhanced filtering mode enable flag and is the enhanced filtering mode enable flag for the vertical DBF filtering. In other words, when the vertical DBF filtering is to be performed, PictureDbrVEnableFlag indicates allowing enabling the enhanced filtering mode or disallowing enabling the enhanced filtering mode.

In conclusion, PictureDbrVEnableFlag may represent the enhanced refinement mode enable flag for the vertical DBF filtering and the enhanced filtering mode enable flag for the vertical DBF filtering. In other words, the enhanced refinement mode enable flag and the enhanced filtering mode enable flag share one flag, namely, the current picture allows enabling the enhanced refinement mode and the enhanced filtering mode at the same time, or disallows enabling the enhanced refinement mode and the enhanced filtering mode at the same time.

The deblocking filtering vertical refinement threshold is represented as dbr_v_threshold_minus1 which is used to determine a threshold of the deblocking filtering vertical refinement of the current picture, where the threshold is in a range of 0 to 1. The value of DbrVThreshold is equal to the value of dbr_v_threshold_minus1 plus 1. If there is no dbr_v_threshold_minus1 in a bit stream, the value of DbrVThreshold is 0.

In some embodiments, for the enhanced refinement mode, DbrVThreshold corresponds to the first refinement threshold (for example, the third refinement threshold and the first refinement threshold are same), and is the first refinement threshold for the vertical DBF filtering. In other words, when the vertical DBF filtering is to be performed, DbrVThreshold represents the first refinement threshold in the above embodiment. Further, the second refinement threshold (for example, the fourth refinement threshold and the second refinement threshold are same) and the first refinement threshold in the above embodiment are opposite numbers to each other, and thus, the second refinement threshold may be determined based on DbrVThreshold.

In some embodiments, for the enhanced filtering mode, DbrVThreshold corresponds to the first filtering threshold (for example, the third filtering threshold and the first filtering threshold are same), and is the first filtering threshold for the vertical DBF filtering. In other words, when the vertical DBF filtering is to be performed, DbrVThreshold represents the first filtering threshold in the above embodiment. Further, the second filtering threshold (for example, the fourth filtering threshold and the second filtering threshold are same) in the above embodiment and the first filtering threshold are opposite numbers to each other, and thus, the second filtering threshold may be determined based on DbrVThreshold.

In conclusion, DbrVThreshold may represent the first refinement threshold and the first filtering threshold for the vertical DBF filtering, and in other words, the first refinement threshold and the first filtering threshold are same and can be given a same value.

The deblocking filtering vertical refinement offset value 0 (dbr_v_offset0_minus1) is used to determine an offset value 0 of the deblocking filtering vertical refinement of the current picture, which is valued between 0 and 3. The value of DbrVOffset0 is equal to a negative value which is an opposite number of the sum result of dbr_v_offset0_minus1 plus 1. If there is no dbr_v_offset0_minus1 in a bit stream, the value of DbrVOffset0 is 0.

In some embodiments, for the enhanced filtering mode, DbrVOffset0 corresponds to the first filtering offset value (for example, the third filtering offset value and the first filtering offset value are same), and is the first filtering offset value for the vertical DBF filtering. When the vertical DBF filtering is to be performed, DbrVOffset0 represents the first filtering offset value in the above embodiment.

The deblocking filtering vertical refinement offset value 1 (dbr_v_offset1 minus1) is used to determine an offset value 1 of the deblocking filtering vertical refinement of the current picture, which is valued between 0 and 3. The value of DbrVOffset1 is equal to the value of dbr_v_offset1 minus1 plus 1. If there is no dbr_v_offset1minus1 in a bit stream, the value of DbrVOffset1 is 0.

In some embodiments, for the enhanced filtering mode, DbrVOffset1 corresponds to the second filtering offset value (for example, the fourth filtering offset value and the second filtering offset value are same), and is the second filtering offset value for the vertical DBF filtering. When the vertical DBF filtering is to be performed, DbrVOffset1 represents the second filtering offset value in the above embodiment.

The enhanced deblocking filtering vertical refinement offset value 0 (dbr_v_alt_offset0_minus1) is used to determine an offset value 0 of the deblocking filtering vertical refinement of the current picture when the BS value is 0, where the value of dbr_v_alt_offset0_minus1 is between 0 and 3. The value of DbrVAltOffset0 is equal to a negative value which is an opposite number of the sum result of dbr_v_alt_offset0_minus1 plus 1. If there is no dbr_v_alt_offset0_minus1 in a bit stream, the value of DbrVAltOffset0 is 0.

In some embodiments, for the enhanced refinement mode, DbrVAltOffset0 corresponds to the first refinement offset value (for example, the third refinement offset value and the first refinement offset value are same), and is the first refinement offset value for the vertical DBF filtering. When the vertical DBF filtering is to be performed, DbrVAltOffset0 represents the first refinement offset value in the above embodiment.

The enhanced deblocking filtering vertical refinement offset value 1 (dbr_v_alt_offset1_minus1) is used to determine an offset value 1 of the deblocking filtering vertical refinement of the current picture when the BS value is 0, where the value of dbr_v_alt_offset1_minus1 is between 0 and 3. The value of DbrVAltOffset1 is equal to the value of dbr_v_alt_offset1_minus1 plus 1. If there is no dbr_v_alt_offset1_minus1 in a bit stream, the value of DbrVAltOffset1 is 0.

In some embodiments, for the enhanced refinement mode, DbrVAltOffset1 corresponds to the second refinement offset value (for example, the fourth refinement offset value and the second refinement offset value are same), and is the second refinement offset value for the vertical DBF filtering. When the vertical DBF filtering is to be performed, DbrVAltOffset1 represents the second refinement offset value in the above embodiment.

The picture-level deblocking filtering horizontal refinement enable flag is represented as picture_dbr_h_enable_flag, which is a binary variable, where the value "1" indicates that the current picture allows using the deblocking filtering horizontal refinement, and the value "0" indicates that the current picture disallows using the deblocking filtering horizontal refinement. The value of PhDbrHEnableFlag is equal to the value of picture_dbr_h_enable_flag. If there is no picture_dbr_h_enable_flag in a bit stream, the value of PhDbrHEnableFlag is 0.

In some embodiments, for the enhanced refinement mode, PhDbrHEnableFlag corresponds to the enhanced refinement mode enable flag and is the enhanced refinement mode enable flag for the horizontal DBF filtering. In other words, when the horizontal DBF filtering is to be performed, PhDbrHEnableFlag indicates allowing enabling the enhanced refinement mode or disallowing enabling the enhanced refinement mode.

In some embodiments, for the enhanced filtering mode, PhDbrHEnableFlag corresponds to the enhanced filtering mode enable flag and is the enhanced filtering mode enable flag for the horizontal DBF filtering. In other words, when the horizontal DBF filtering is to be performed, PhDbrHEnableFlag indicates allowing enabling the enhanced filtering mode or disallowing enabling the enhanced filtering mode.

In conclusion, PhDbrHEnableFlag may represent the enhanced refinement mode enable flag for the horizontal DBF filtering and the enhanced filtering mode enable flag for the horizontal DBF filtering. In other words, the enhanced refinement mode enable flag and the enhanced filtering mode enable flag share one flag, namely, the current picture allows enabling the enhanced refinement mode and the enhanced filtering mode at the same time, or disallows enabling the enhanced refinement mode and the enhanced filtering mode at the same time.

The deblocking filtering horizontal refinement threshold is represented as dbr_h_threshold_minus1 which is used to determine a threshold of the deblocking filtering horizontal refinement of the current picture, where the threshold is valued between 0 and 1. The value of DbrHThreshold is equal to the value of dbr_h_threshold_minus1 plus 1. If there is no dbr_h_threshold_minus1 in a bit stream, the value of DbrHThreshold is 0.

In some embodiments, for the enhanced refinement mode, DbrHThreshold corresponds to the first refinement threshold (for example, the third refinement threshold and the first refinement threshold are same), and is the first refinement threshold for the horizontal DBF filtering. In other words, when the horizontal DBF filtering is to be performed, DbrHThreshold represents the first refinement threshold in the above embodiment. Further, the second refinement threshold (for example, the fourth refinement threshold and the second refinement threshold are same) in the above embodiment and the first refinement threshold are opposite numbers to each other, and thus, the second refinement threshold may be determined based on DbrHThreshold.

In some embodiments, for the enhanced filtering mode, DbrHThreshold corresponds to the first filtering threshold (for example, the third filtering threshold and the first filtering threshold are same), and is the first filtering threshold for the horizontal DBF filtering. In other words, when the horizontal DBF filtering is to be performed, DbrHThreshold represents the first filtering threshold in the above embodiment. Further, the second filtering threshold (for example, the fourth filtering threshold and the second filtering threshold are same) in the above embodiment and the first filtering threshold are opposite numbers to each other, and thus, the second filtering threshold may be determined based on DbrHThreshold.

In conclusion, DbrHThreshold may represent the first refinement threshold and the first filtering threshold for the horizontal DBF filtering, namely, the first refinement threshold and the first filtering threshold are same and given a same value.

The deblocking filtering horizontal refinement offset value 0 (dbr_h_offset0_minus1) is used to determine an offset value 0 of the deblocking filtering horizontal refinement of the current picture, where the offset value is between 0 and 3. The value of DbrHOffset0 is equal to a negative value which is an opposite number of the sum result of dbr_h_offset0_minus1 plus 1. If there is no dbr_h_offset0_minus1 in a bit stream, the value of DbrHOffset0 is 0.

In some embodiments, for the enhanced filtering mode, DbrHOffset0 corresponds to the first filtering offset value (for example, the third filtering offset value and the first filtering offset value are same), and is the first filtering offset value for the horizontal DBF filtering. When the horizontal DBF filtering is to be performed, DbrHOffset0 represents the first filtering offset value in the above embodiment.

The deblocking filtering horizontal refinement offset value 1 (dbr_h_offset1_minus1) is used to determine an offset value 1 of the deblocking filtering horizontal refinement of the current picture, where the offset value is between 0 and 3. The value of DbrHOffset1 is equal to the value of dbr_h_offset1_minus1 plus 1. If there is no dbr_h_offset1_minus1 in a bit stream, the value of DbrHOffset1 is 0.

In some embodiments, for the enhanced filtering mode, DbrHOffset1 corresponds to the second filtering offset value (for example, the fourth filtering offset value and the second filtering offset value are same), and is the second filtering offset value for the horizontal DBF filtering. In other words, when the horizontal DBF filtering is to be performed, DbrHOffset1 represents the second filtering offset value in the above embodiment.

The enhanced deblocking filtering horizontal refinement offset value 0 (dbr_h_alt_offset0_minus1) is used to determine an offset value 0 of the deblocking filtering horizontal refinement of the current picture when the BS value is 0, where the value of dbr_h_alt_offset0_minus1 is between 0 and 3. The value of DbrHAltOffset0 is equal to a negative value which is an opposite number of the sum result of dbr_h_alt_offset0_minus1 plus 1. If there is no dbr_h_alt_offset0_minus1 in a bit stream, the value of DbrHAltOffset0 is 0.

In some embodiments, for the enhanced refinement mode, DbrHAltOffset0 corresponds to the first refinement offset value (for example, the third refinement offset value and the first refinement offset value are same), and is the first refinement offset value for the horizontal DBF filtering. In other words, when the horizontal DBF filtering is to be performed, DbrHAltOffset0 represents the first refinement offset value in the above embodiment.

The enhanced deblocking filtering horizontal refinement offset value 1 (dbr_h_alt_offset1_minus1) is used to determine an offset value 1 of the deblocking filtering horizontal refinement of the current picture when the BS value is 0, where the value of dbr_h_alt_offset1_minus1 is between 0 and 3. The value of DbrHAltOffset1 is equal to the value of dbr_h_alt_offset1_minus1 plus 1. If there is no dbr_h_alt_offset1_minus1 in a bit stream, the value of DbrHAltOffset1 is 0.

In some embodiments, for the enhanced refinement mode, DbrHAltOffset1 corresponds to the second refinement offset value (for example, the fourth refinement offset value and the second refinement offset value are same), and is the second refinement offset value for the horizontal DBF filtering. In other words, when the horizontal DBF filtering is to be performed, DbrHAltOffset1 represents the second refinement offset value in the above embodiment.

Embodiment 14: reference may be made to Table 2 for one expression of the high-level syntax (e.g. picture header high-level syntax), for example, a syntax shown by the picture header encoding/decoding table 2. The encoder encodes, in the picture header, the syntaxes shown in table 2, and the decoder decodes, in the picture header, the syntaxes shown in Table 2.

TABLE 2

```
picture_dbr_v_enable_flag
if (PictureDbrVEnableFlag) {
    dbr_v_offset0_minus1
    dbr_v_offset1_minus1
}
picture_alt_dbr_v_enable_flag
if (PictureAltDbrVEnableFlag) {
    dbr_v_alt_offset0_minus1
    dbr_v_alt_offset1_minus1
```

TABLE 2-continued

```
}
if (PictureDbrVEnableFlag || PictureAltDbrVEnableFlag) {
    dbr_v_threshold_minus1
}
picture_dbr_h_enable_flag
if (PictureDbrHEnableFlag) {
    dbr_h_offset0_minus1
    dbr_h_offset1_minus1
}
picture_alt_dbr_h_enable_flag
if (PictureAltDbrHEnableFlag) {
    dbr_v_alt_offset0_minus1
    dbr_v_alt_offset1_minus1
}
if (PictureDbrHEnableFlag || PictureAltDbrHEnableFlag) {
    dbr_h_threshold_minus1
```

In Table 2, the meanings of relevant syntaxes are described below.

The picture-level enhanced vertical refinement enable flag is represented as picture_alt_dbr_v_enable_flag which is a binary variable, where the value "1" indicates the current picture allows using the enhanced vertical refinement, and the value "0" indicates the current picture disallows using the enhanced vertical refinement. The value of PictureAltDbrVEnableFlag is equal to the value of picture_alt_dbr_v_enable_flag. If there is no picture_alt_dbr_v_enable_flag in a bit stream, the value of PhAltDbrVEnableFlag is 0.

In some embodiments, for the enhanced refinement mode, PictureAltDbrVEnableFlag corresponds to the enhanced refinement mode enable flag and is the enhanced refinement mode enable flag for the vertical DBF filtering. In other words, when the vertical DBF filtering is to be performed, PictureAltDbrVEnableFlag indicates allowing enabling the enhanced refinement mode or disallowing enabling the enhanced refinement mode.

Different from PictureDbrVEnableFlag in the embodiment 13, PictureAltDbrVEnableFlag is only the enhanced refinement mode enable flag for the vertical DBF filtering rather than the enhanced filtering mode enable flag for the vertical DBF filtering.

The picture-level enhanced horizontal refinement enable flag is represented as picture_alt_dbr_h_enable_flag which is a binary variable, where the value "1" indicates the current picture allows using the enhanced horizontal refinement, and the value "0" indicates the current picture disallows using the enhanced horizontal refinement. The value of PictureAltDbrHEnableFlag is equal to the value of picture_alt_dbr_h_enable_flag. If there is no picture_alt_dbr_h_enable_flag in a bit stream, the value of PhAltDbrHEnableFlag is 0.

In some embodiments, for the enhanced refinement mode, PhAltDbrHEnableFlag corresponds to the enhanced refinement mode enable flag and is the enhanced refinement mode enable flag for the horizontal DBF filtering. In other words, when the horizontal DBF filtering is to be performed, PhAltDbrHEnableFlag indicates allowing enabling the enhanced refinement mode or disallowing enabling the enhanced refinement mode.

Different from PictureDbrHEnableFlagin the embodiment 13, PhAltDbrHEnableFlag is only the enhanced refinement mode enable flag for the horizontal DBF filtering rather than the enhanced filtering mode enable flag for the horizontal DBF filtering.

The meanings of other syntaxes in Table 2 are same as the meanings of relevant syntaxes in Table 1 and thus will not be repeated herein.

Embodiment 15: for the embodiment 11, adbr_enable_flag can be encoded and decoded only when the deblocking filtering mode is enabled. Namely, whether to enable the deblocking filtering mode may be firstly determined, and if the deblocking filtering mode is enabled, the flag adbr_enable_flag can be encoded/decoded in the sequence header, and if the deblocking filtering mode is not enabled, the flag adbr_enable_flag is not encoded/decoded in the sequence header. In one word, the enhanced refinement mode (adbr_enable_flag is used to control the enhanced refinement mode to be enabled) is a sub-mode of the deblocking filtering mode, which is allowed to be enabled only when the deblocking filtering mode is enabled.

For the embodiment 12, dbr_enable_fla can be encoded and decoded only when the deblocking filtering mode is enabled. Namely, whether to enable the deblocking filtering mode may be firstly determined, and if the deblocking filtering mode is enabled, the flag dbr_enable_flag can be encoded/decoded in the sequence header, and if the deblocking filtering mode is no enabled, the flag dbr_enable_flag is not encoded/decoded in the sequence header. In one word, the enhanced filtering mode (dbr_enable_flag is used to control the enhanced filtering mode to be enabled) is a sub-mode of the deblocking filtering mode, which is allowed to be enabled only when the deblocking filtering mode is enabled.

For the embodiment 13, the high-level syntaxes (used to control the enhanced filtering mode and the enhanced refinement mode to be enabled) shown in Table 1 are encoded and decoded only when the deblocking filtering mode is enabled. Namely, whether to enable the deblocking filtering mode may be firstly determined, and if the deblocking filtering mode is enabled, the high-level syntaxes shown in Table 1 are encoded/decoded in the picture header, and if the deblocking filtering mode is not enabled, the high-level syntaxes shown in Table 1 are not encoded/decoded in the picture header.

For the embodiment 14, the high-level syntaxes (used to control the enhanced filtering mode and the enhanced refinement mode to be enabled) shown in Table 2 are encoded and decoded only when the deblocking filtering mode is enabled. Namely, whether to enable the deblocking filtering mode may be firstly determined, and if the deblocking filtering mode is enabled, the high-level syntaxes shown in Table 2 are encoded/decoded in the picture header, and if the deblocking filtering mode is not enabled, the high-level syntaxes shown in Table 2 are not encoded/decoded in the picture header.

Embodiment 16: for a deblocking filtering process of a luma component (i.e. the current block is the luma component), for example, the luma component is refined based on the enhanced refinement mode or on the enhanced filtering mode.

The DBR parameters of the luma component are derived in the following process:

If the current to-be-filtered boundary is a vertical boundary and the value of PictureDbrVEnableFlag is 1, or the current to-be-filtered boundary is a horizontal boundary and the value of PictureDbrHEnableFlag is 1, the value of PictureDbrEnableFlag is 1; and otherwise, the value of PictureDbrEnableFlag is 0. If the current to-be-filtered boundary is a vertical boundary and the value of PictureAltDbrVEnableFlag is 1, or the current to-be-filtered boundary is a horizontal boundary and the value of PictureAltDbrHEnableFlag is 1, the value of PictureAltDbrEnableFlag is 1, and otherwise, the value of PictureAltDbrEnableFlag is 0.

By the following method, dbr_th, dbr_offset0, dbr_offset1, alt_dbr_offset0 and alt_dbr_offset1 can be derived:

For the vertical boundary, dbr_th=DbrVThreshold, dbr_offset0=DbrVOffset0, dbr_offset1=DbrVOffset1, alt_dbr_offset0=DbrVAltOffset0 and alt_dbr_offset1=DbrVAltOffset1.

For the horizontal boundary, dbr_th=DbrHThreshold, dbr_offset0=DbrHOffset0, dbr_offset1=DbrHOffset1, alt_dbr_offset0=DbrHAltOffset0 and alt_dbr_offset1=DbrHAltOffset1.

(1) The boundary filtering process when the BS value of the luma component is 4 is as follows (using the enhanced filtering mode for processing):

When the BS value is 4, the filtering calculation processes for p0, p1, p2 and q0, q1, q2 are as follows:

$$P0=(p2*3+p1*8+p0*10+q0*8+q1*3+16)>>5;$$

$$P1=(p2*4+p1*5+p0*4+q0*3+8)>>4;$$

$$P2=(p3*2+p2*2+p1*2+p0*1+q0*1+4)>>3;$$

$$Q0=(p1*3+p0*8+q0*10+q1*8+82\times3+16)>>5;$$

$$Q1=(p0*3+q0*4+q1*5+q2*4+8)>>4;$$

$$Q2=(p0*1+q0*1+q1*2+q2*2+q3*2+4)>>3.$$

P0, P1, P2 and Q0, Q1, Q2 are all filtered values (filtered pixel values).

After P0, P1, P2 and Q0, Q1, Q2 are obtained, if the value of PhDbrEnableFlag is 1, then, if pi>Pi+dbr_th, then Pi'=clip((Pi+pi+1)>>1+dbr_offset0); otherwise, if pi<Pi−dbr_th, then Pi'=clip((Pi+pi+1)>>1+dbr_offset1), where i=0, 1 or 2;

if qi>Qi+dbr_th, then Qi'=clip((Qi+qi+1)>>1+dbr_offset0); otherwise, if qi<Qi-dbr_th, then Qi'=clip((Qi+qi+1)>>1+dbr_offset1), where i=0, 1 or 2.

In the above formulas, pi may represent an original pixel value, qi may represent an original pixel value, Pi may represent a filtered pixel value, Qi may represent a filtered pixel value, Pi' may represent a refined pixel value, and Qi' may represent a refined pixel value.

(2) The boundary filtering process when the BS value of the luma component (used the enhanced filtering mode for processing) is 3 is as follows:

When the BS value is 3, the filtering calculation processes for p0, p1 and q0, q1 are as follows:

$$P0=(p2+(p1<<2)+(p0<<2)+(p0<<1)+(q0<<2)+q1+8)>>4;$$

$$P1=((p2<<1)+p2+(p1<<3)+(p0<<2)+q0+8)>>4;$$

$$Q0=(p1+(p0<<2)+(q0<<2)+(q0<<1)+(q1<<2)+q2+8)>>4;$$

$$Q1=((q2<<1)+q2+(q1<<3)+(q0<<+p0+8)>>4.$$

P0, P1 and Q0, Q1 are all filtered values (filtered pixel values).

After P0, P1 and Q0, Q1 are obtained, if the value of PhDbrEnableFlag is 1, then, if pi>Pi+dbr_th, then Pi'=clip((Pi+pi+1)>>1+dbr_offset0); otherwise, if pi<Pi−dbr_th, then Pi'=clip((Pi+pi+1)>>1+dbr_offset1), where i=0, 1;

if qi>Qi+dbr_th, then Qi'=clip((Qi+qi+1)>>1+dbr_offset0); otherwise, if qi<Qi-dbr_th, then Qi'=clip((Qi+qi+1)>>1+dbr_offset1), where i=0, 1.

In the above formulas, pi may represent an original pixel value, qi may represent an original pixel value, Pi may represent a filtered pixel value, Qi may represent a filtered pixel value, Pi' may represent a refined pixel value and Qi' may represent a refined pixel value.

(3) The boundary filtering process when the BS value of the luma component is 2 (using the enhanced filtering mode for processing) is as follows:

When the BS value is 2, the filtering calculation processes for p0 and q0 are as follows:

$$P0=((p1<<1)+p1+(p0<<3)+(p0<<1)+(q0<<1)+q0+8)>>4;$$

$$Q0=((p0<<1)+p0+(q0<<3)+(q0<<1)+(q1<<1)+q1+8)>>4.$$

P0 and Q0 both are filtered values (filtered pixel values).

After P0 and Q0 are obtained, if the value of PhDbrEnableFlag is 1, then:

if pi>Pi+dbr_th, then Pi'=clip((Pi+pi+1)>>1+dbr_offset0); otherwise, if pi<Pi−dbr_th, then Pi'=clip((Pi+pi+1)>>1+dbr_offset1), where i=0;

if qi>Qi+dbr_th, then Qi'=clip((Qi+qi+1)>>1+dbr_offset0); otherwise, if qi<Qi-dbr_th, then Qi'=clip((Qi+qi+1)>>1+dbr_offset1), where i=0.

In the above formulas, pi may represent an original pixel value, qi may represent an original pixel value, Pi may represent a filtered pixel value, Qi may represent a filtered pixel value, Pi' may represent a refined pixel value and Qi' may represent a refined pixel value.

(4) The boundary filtering process when the BS value of the luma component is 1 (using the enhanced filtering mode for processing) is as follows:

When the BS value is 1, the filtering calculation processes for p0 and q0 are as follows:

$$P0=((p0<<1)+p0+q0+2)>>2;$$

$$Q0=((q0<<1)+q0+p0+2)>>2.$$

P0 and Q0 both are filtered values (filtered pixel values).

After P0 and Q0 are obtained, if the value of PhDbrEnableFla is 1, then:

if pi>Pi+dbr_th, then Pi'=clip((Pi+pi+1)>>1+dbr_offset0); otherwise, if pi<Pi−dbr_th, then Pi'=clip((Pi+pi+1)>>1+dbr_offset1), where i=0;

if qi>Qi+dbr_th, then Qi'=clip((Qi+qi+1)>>1+dbr_offset0); otherwise, if qi<Qi-dbr_th, then Qi'=clip((Qi+qi+1)>>1+dbr_offset1), where i=0.

In the above formulas, pi may represent an original pixel value, qi may represent an original pixel value, Pi may represent a filtered pixel value, Qi may represent a filtered pixel value, Pi' may represent a refined pixel value and Qi' may represent a refined pixel value.

(5) The boundary filtering process when the BS value of the luma component is 0 is performed in a manner 1 (using the enhanced refinement mode for processing):

When the BS value is 0, the filtering calculation processes for pi and qi are as follows:

The gradient value DPi of pi and the gradient value DQi of qi are determined. For example, DPi=(pi-qi+2)>>2 and DQi=(qi-pi+2)>>2, or, DPi=(pi-qi+1)>>1 and DQi=(qi-pi+1)>>1.

After DPi and DQi are obtained, if the value of PhAltDbrEnableFlag is 1, then:

if DPi>dbr_th, then Pi=clip(pi+alt_dbr_offset0); otherwise, if DPi←−dbr_th, then Pi=clip(pi+alt_dbr_offset1);

if DQi>dbr_th, then Qi=clip(qi+alt_dbr_offset0); otherwise, if DQi←−dbr_th, then Qi=clip(qi+alt_dbr_offset1).

The above i may be 0, or may be 0, 1, 2 or the like, which is not limited herein.

In the above formulas, pi may represent an original pixel value, qi may represent an original pixel value, DPi may represent a gradient value, DQi may represent a gradient value, Pi may represent a refined pixel value and Qi may represent a refined pixel value.

(6) The boundary filtering process when the BS value of the luma component is 0 is performed in a manner 2 (using the enhanced refinement mode for processing):

When the BS value is 0, the filtering calculation processes for pi and qi are as follows:

The gradient value DPi of pi and the gradient value DQi of qi are determined. For example, DPi=(pi-qi+1)>>1 and DQi=(qi-pi+1)>>1.

After DPi and DQi are obtained, if the value of PhAltDbrEnableFlag is 1, then:

if DPi>2*dbr_th, then Pi=clip(pi+alt_dbr_offset0); otherwise, if DPi←−2*dbr_th, then Pi=clip(pi+alt_dbr_offset1);

if DQi>2*dbr_th, then Qi=clip(qi+alt_dbr_offset0); otherwise, if DQi←−2*dbr_th, then Qi=clip(qi+alt_dbr_offset1).

The above 2*dbr_th and −2*dbr_th may be refinement thresholds in the above embodiments.

The above i may be 0, or may be 0, 1, 2, or the like, which is not limited herein.

In the above formulas, pi may represent an original pixel value, qi may represent an original pixel value, DPi may represent a gradient value, DQi may represent a gradient value, Pi may represent a refined pixel value and Qi may represent a refined pixel value.

(7) The boundary filtering process when the BS value of the luma component is 0 is performed in a manner 3 (using the enhanced refinement mode for processing):

When the BS value is 0, the filtering calculation processes for pi and qi are as follows:

The gradient value DPi of pi and the gradient value DQi of qi are determined. For example, the gradient value DPi and the gradient value DQi may be determined in the following manner: DPi=((pi<<1)+pi+qi+2)>>2 and DQi=((qi<<1)+qi+pi+2)>>2.

After DPi and DQi are obtained, if the value of PhAltDbrEnableFlag is 1, then:

if pi>DPi+dbr_th, then Pi=clip(pi+alt_dbr_offset0); otherwise, if pi<DPi-dbr_th, then Pi=clip(pi+alt_dbr_offset1);

if qi>DQi+dbr_th, then Qi=clip(qi+alt_dbr_offset0); otherwise, if qi<DQi-dbr_th, then Qi=clip(qi+alt_dbr_offset1).

In one possible implementation, the above expression may be equivalent to the following expression form:

The gradient value DPi of pi and the gradient value DQi of qi are determined. For example, the gradient value DPi and the gradient value DQi may be determined in the following manner: DPi=pi−(((pi<<1)+pi+qi+2)>>2) and DQi=qi−(((qi<<1)+qi+pi+2)>>2).

After DPi and DQi are obtained, if the value of PhAltDbrEnableFlag is 1, then:

if DPi>dbr_th, then Pi=clip(pi+alt_dbr_offset0); otherwise, if DPi←−dbr_th, then Pi=clip(pi+alt_dbr_offset1);

if DQi>dbr_th, then Qi=clip(pi+alt_dbr_offset0); otherwise, if DQi←−dbr_th, then Qi=clip(qi+alt_dbr_offset1).

The above i may be 0, or may be 0, 1, 2, or the like, which is not limited herein.

In the above formulas, pi may represent an original pixel value, qi may represent an original pixel value, DPi may represent a gradient value, DQi may represent a gradient value, Pi may represent a refined pixel value and Qi may represent a refined pixel value.

In the above embodiment, clip(x) represents that x is limited within [0, 2^(bit_depth)−1] (the interval includes 0 and $2^{\wedge}$(bit_depth)-1), where bit depth represents a picture bit depth, which is usually 8, 10, 12 or the like.

(8) The boundary filtering process when the BS value of the luma component is 0 is performed in a manner 4 (using the enhanced refinement mode for processing):

When the BS value is 0, the filtering calculation processes for pi and qi are as follows:

The gradient value DPi of pi and the gradient value DQi of qi are determined. For example, the gradient value DPi and the gradient value DQi may be determined in the following manner: DPi=(qi−pi+2)>>2 and DQi=(pi−qi+2)>>2.

After DPi and DQi are obtained, if the value of PhAltDbrEnableFlag is 1, then:

if DPi<dbr_th, then Pi=clip(pi+dbr_alt_offset0); otherwise, if DPi>−dbr_th, then Pi=clip(pi+dbr_alt_offset1);

if DQi<dbr_th, then Qi=clip(qi+alt_dbr_offset0); otherwise, if DQi>−dbr_th, then Qi=clip(qi+dbr_alt_offset1).

The above i may be 0, or may be 0, 1, 2, or the like, which is not limited herein.

In the above formulas, pi may represent an original pixel value, qi may represent an original pixel value, DPi may represent a gradient value, DQi may represent a gradient value, Pi may represent a refined pixel value and Qi may represent a refined pixel value.

(9) The boundary filtering process when the BS value of the luma component is 0 is performed in a manner 5 (using the enhanced refinement mode for processing):

When the BS value is 0, the filtering calculation processes for pi and qi are as follows:

The gradient value DPi of pi and the gradient value DQi of qi are determined. For example, the gradient value DPi and the gradient value DQi may be determined in the following manner: DPi=pi−(((pi<<1)+pi+qi+2)>>2), i.e. DPi=(pi−qi−2)>>2, and DQi=qi−(((qi<<1)+qi+pi+2)>>2), i.e. DQi=(qi−pi−2)>>2.

After DPi and DQi are obtained, if the value of PhAltDbrEnableFlag is 1, then:

if DPi>dbr_th, then Pi=clip (pi+dbr_alt_offset0); otherwise, if DPi←dbr_th, then Pi=clip (pi+dbr_alt_offset1);

if DQi>dbr_th, then Qi=clip (qi+dbr_alt_offset0); otherwise, if DQi←dbr_th, then Qi=clip (qi+dbr_alt_offset1).

The above i may be 0, or may be 0, 1, 2, or the like, which is not limited herein.

In the above formulas, pi may represent an original pixel value, qi may represent an original pixel value, DPi may represent a gradient value, DQi may represent a gradient value, Pi may represent a refined pixel value and Qi may represent a refined pixel value.

Embodiment 17: for the embodiments 11 and 12, the SPS high-level syntax may be replaced with the PPS high-level syntax or the picture header high-level syntax or the picture high-level syntax or the slice header high-level syntax or the CTU high-level syntax or the CU high-level syntax, where the types of the high-level syntaxes are not limited herein as long as the high-level syntaxes can transmit dbr_enable_flag or adbr_enable_flag. For the embodiments 13 and 14, the picture header high-level syntax may be replaced with the SPS high-level syntax, or the PPS high-level syntax, or the picture high-level syntax, or the slice header high-level syntax, or the CTU high-level syntax or the CU high-level syntax, where the types of the high-level syntaxes are not limited herein as long as the high-level syntaxes can transmit the contents of Table 1 and Table 2, namely, the high-level syntaxes can transmit the enhanced refinement mode enable flag, the enhanced filtering mode enable flag, the first refinement threshold, the first filtering threshold, the first filtering offset value, the second filtering offset value, the first refinement offset value, the second refinement offset value or the like, where the specific implementation is similar to that of the embodiments 13 and 14 and will not be repeated herein.

For the embodiments 13 and 14, the picture header high-level syntax may be replaced with the CTU high-level syntax which transmits DBR-related parameters, where the DBR-related parameters include the first refinement threshold, the first filtering threshold, the first filtering offset value, the second filtering offset value, the first refinement offset value, the second refinement offset value and the like as shown in the embodiments 13 and 14. Alternatively, the picture header high-level syntax may be replaced with the CU high-level syntax which transmits DBR-related parameters, where the DBR-related parameters include the first refinement threshold, the first filtering threshold, the first filtering offset value, the second filtering offset value, the first refinement offset value, the second refinement offset value and the like as shown in the embodiments 13 and 14.

Embodiment 18: for the embodiment 16, it is a deblocking filtering process for the luma component; further, the luma component may be replaced with the chroma component and deblocking filtering process is performed on the chroma component (i.e. the current block is the chroma component). The deblocking filtering process of the chroma component is similar to the deblocking filtering process of the luma component as shown in the embodiment 16 and no redundant descriptions are made herein.

In some embodiments, the above embodiments 1 to 18 may be implemented separately or by combinations, for example, the embodiment 1 and the embodiment 2 may be combined, the embodiment 1 and the embodiment 3 may be combined, the embodiment 1 and the embodiment 4 may be combined, the embodiment 1 and the embodiment 5 may be combined, and the embodiment 1 and at least one of the embodiments 8 to 18 may be combined; at least two of the embodiments 8 to 18 may be arbitrarily combined; the embodiment 2 and at least one of the embodiments 8 to 18 may be combined; the embodiment 3 and at least one of the embodiments 8 to 18 may be combined; the embodiment 4 and at least one of the embodiments 8 to 18 may be combined; the embodiment 5 and at least one of the embodiments 8 to 18 may be combined; the embodiment 6 and at least one of the embodiments 8 to 18 may be combined; the embodiment 7 and at least one of the embodiments 8 to 18 may be combined. Of course, the above are only several combination examples and at least any two embodiments of the embodiments 1 to 18 may be combined to implement relevant process.

In some embodiments, in each of the above embodiments, the contents of the encoder may be applied to the decoder, and, the decoder may perform processing in the same manner. The contents of the decoder may be applied to the encoder, and the encoder may perform processing in the same manner.

Embodiment 19: based on the same application idea as the above method, an embodiment of the present disclosure provides a decoding apparatus, which is applied to a decoder. The decoding apparatus includes: a memory configured to store video data; a decoder, configured to implement the encoding and decoding method shown in the embodiments 1 to 18, namely, implement the processing flow of the decoder.

For example, in one possible implementation, the decoder is configured to:

if a current pixel point in a current block satisfies an enable condition of an enhanced refinement mode, determine a gradient value of the current pixel point based on an original pixel value of the current pixel point and an original pixel value of a surrounding pixel point of the current pixel point; based on the gradient value of the current pixel point and the original pixel value of the current pixel point, determine a refined pixel value of the current pixel point.

Based on the same application idea as the above method, an embodiment of the present disclosure provides an encoding apparatus which is applied to an encoder. The encoding apparatus includes: a memory configured to store video data; an encoder, configured to implement the encoding and decoding method shown in the embodiments 1 to 18, namely, implement the processing flow of the encoder.

For example, in one possible implementation, the encoder is configured to:

if a current pixel point in a current block satisfies an enable condition of an enhanced refinement mode, determine a gradient value of the current pixel point based on an original pixel value of the current pixel point and an original pixel value of a surrounding pixel point of the current pixel point; based on the gradient value of the current pixel point and the original pixel value of the current pixel point, determine a refined pixel value of the current pixel point.

Figure 5A:
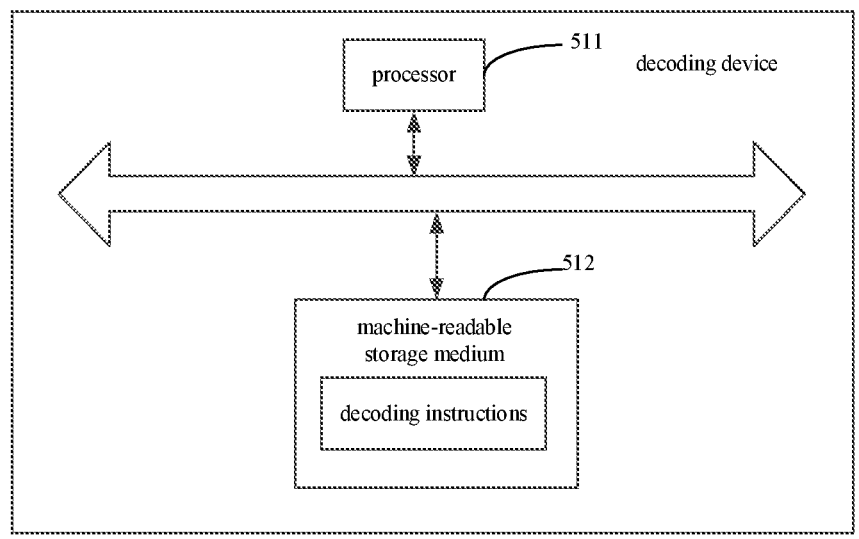
FIG. 5A is a schematic diagram illustrating a hardware structure of a decoder device according to an embodiment of the present disclosure.

Based on the same application idea as the above method, an embodiment of the present disclosure provides a decoder device (also referred to as video decoder). From hardware level, reference can be made to FIG. 5A for the hardware architecture diagram of the decoder device, which includes: a processor 511 and a machine-readable storage medium 512. The machine-readable storage medium 512 stores machine executable instructions executable by the processor 511, and the processor 511 is configured to execute the machine executable instructions to perform the method of the above embodiments 1 to 18 of the present disclosure. For example, the processor 511 is configured to execute the machine executable instructions to perform the steps of:

if a current pixel point in a current block satisfies an enable condition of an enhanced refinement mode, determining a gradient value of the current pixel point based on an original pixel value of the current pixel point and an original pixel value of a surrounding pixel point of the current pixel point; based on the gradient value of the current pixel point and the original pixel value of the current pixel point, determining a refined pixel value of the current pixel point.

Figure 5B:
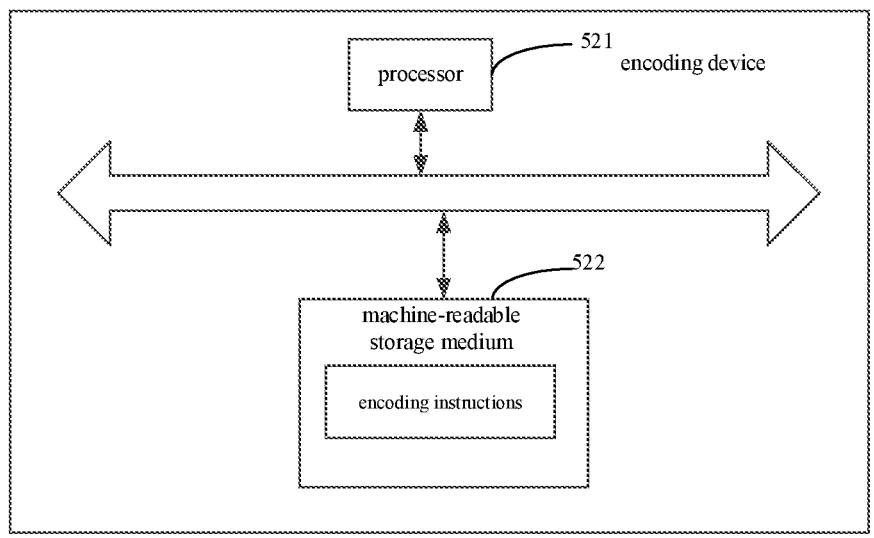
FIG. 5B is a schematic diagram illustrating a hardware structure of an encoder device according to an embodiment of the present disclosure.

Based on the same application idea as the above method, an embodiment of the present disclosure provides an encoder device (also referred to as video encoder). From hardware level, reference can be made to FIG. 5B for the hardware architecture diagram of the encoder device, which includes: a processor 521 and a machine-readable storage medium 522. The machine-readable storage medium 522 stores machine executable instructions executable by the processor 521, and the processor 521 is configured to execute the machine executable instructions to perform the method of the above embodiments 1 to 18 of the present disclosure. For example, the processor 521 is configured to execute the machine executable instructions to perform the steps of:

if a current pixel point in a current block satisfies an enable condition of an enhanced refinement mode, determining a gradient value of the current pixel point based on an original pixel value of the current pixel point and an original pixel value of a surrounding pixel point of the current pixel point; based on the gradient value of the current pixel point and the original pixel value of the current pixel point, determining a refined pixel value of the current pixel point.

Based on the same application idea as the above method, an embodiment of the present disclosure provides a machine-readable storage medium, storing several computer instructions. The computer instructions are executed by a processor to perform the method as disclosed in the above embodiments of the present disclosure, for example, the encoding and decoding method mentioned in the above embodiments. The machine-readable storage medium may be any electronic, magnetic, optical or physical storage device, and can contain or store information, such as executable instructions, data and the like. For example, the machine-readable storage medium may be a Random Access Memory (RAM), a volatile memory, a non volatile memory, a flash memory, a storage drive (e.g. hard disk drive), a solid state hard disk, any type of storage disk (e.g., compact disk, Digital Video Disk (DVD)), or a similar storage medium, or a combination thereof.

Based on the same application idea as the above method, an embodiment of the present disclosure provides a computer application program, which is executed by a processor to perform the encoding and decoding method as disclosed in the above embodiments.

Based on the same application idea as the above method, an embodiment of the present disclosure provides an encoding and decoding apparatus, which is applied to an encoder or a decoder. The encoding and decoding apparatus includes:

a determining module, configured to, if a current pixel point in a current block satisfies an enable condition of an enhanced refinement mode, determine a gradient value of the current pixel point based on an original pixel value of the current pixel point and an original pixel value of a surrounding pixel point of the current pixel point; and a processing module, configured to, based on the gradient value of the current pixel point and the original pixel value of the current pixel point, determine a refined pixel value of the current pixel point.

In some embodiments, the processing module, when determining the refined pixel value of the current pixel point based on the gradient value of the current pixel point and the original pixel value of the current pixel point, is specifically configured to:

based on the gradient value of the current pixel point, the original pixel value of the current pixel point, a first refinement threshold, a second refinement threshold, a first refinement offset value, and a second refinement offset value, determine the refined pixel value of the current pixel point.

In some embodiments, the processing module, when, based on the gradient value of the current pixel point, the original pixel value of the current pixel point, the first refinement threshold, the second refinement threshold, the first refinement offset value, and the second refinement offset value, determining the refined pixel value of the current pixel point, is specifically configured to: if the gradient value of the current pixel point is greater than the first refinement threshold, determine the refined pixel value of the current pixel point based on the original pixel value of the current pixel point and the first refinement offset value;

if the gradient value of the current pixel point is less than the second refinement threshold, determine the refined pixel value of the current pixel point based on the original pixel value of the current pixel point and the second refinement offset value.

In one possible implementation, if the current pixel point in the current block satisfies the enable condition of the enhanced refinement mode, the determining module is further configured to: determine a reference pixel point corresponding to the current pixel point from a neighboring block of the current block, and based on an original pixel value of the reference pixel point, and an original pixel value of a surrounding pixel point of the reference pixel point, determine a gradient value of the reference pixel point; the processing module is further configured to: based on the gradient value of the reference pixel point and the original pixel value of the reference pixel point, determine a refined pixel value of the reference pixel point.

In some embodiments, the processing module, when determining the refined pixel value of the reference pixel point based on the gradient value of the reference pixel point and the original pixel value of the reference pixel point, specifically configured to:

based on the gradient value of the reference pixel point, the original pixel value of the reference pixel point, a third refinement threshold, a fourth refinement threshold, a third refinement offset value and a fourth refinement offset value, determine the refined pixel value of the reference pixel point.

In some embodiments, the processing module, when based on the gradient value of the reference pixel point, the original pixel value of the reference pixel point, the third refinement threshold, the fourth refinement threshold, the third refinement offset value and the fourth refinement offset value, determining the refined pixel value of the reference pixel point, is specifically configured to: if the gradient value of the reference pixel point is greater than the third refinement threshold, determine the refined pixel value of the reference pixel point based on the original pixel value of the reference pixel point and the third refinement offset value;

if the gradient value of the reference pixel point is less than the fourth refinement threshold, determine the refined pixel value of the reference pixel point based on the original pixel value of the reference pixel point and the fourth refinement offset value.

In one possible implementation, the determining module, when determining the current pixel point in the current block satisfies the enable condition of the enhanced refinement mode, is specifically configured to: if a boundary strength of a to-be-filtered boundary corresponding to the current pixel point in the current block satisfies the enable condition of the enhanced refinement mode, determine the current pixel point satisfies the enable condition of the enhanced refinement mode; or, if feature information corresponding to the current block satisfies the enable condition of the enhanced refinement mode, determine the current pixel point in the current block satisfies the enable condition of the enhanced refinement mode.

In some embodiments, the processing module is further configured to: if the current pixel point in the current block satisfies an enable condition of a general filtering mode, perform deblocking filtering on the original pixel value of the current pixel point to obtain a filtered pixel value of the current pixel point; if the current pixel point in the current block satisfies an enable condition of an enhanced filtering mode, determine the refined pixel value of the current pixel point based on the filtered pixel value of the current pixel point and the original pixel value of the current pixel point.

In some embodiments, the processing module, when determining the refined pixel value of the current pixel point based on the filtered pixel value of the current pixel point and the original pixel value of the current pixel point, is specifically configured to: based on the filtered pixel value of the current pixel point, the original pixel value of the current pixel point, a first filtering threshold, a second filtering threshold, a first filtering offset value, and a second filtering offset value, determine the refined pixel value of the current pixel point, where the first filtering threshold and the second filtering threshold are opposite numbers to each other.

In some embodiments, if the current pixel point in the current block satisfies the enable condition of the general filtering mode, the processing module is further configured to: determine a reference pixel point corresponding to the current pixel point from a neighboring block of the current block; and perform deblocking filtering on the original pixel value of the reference pixel point to obtain a filtered pixel value of the reference pixel point;

if the current pixel point in the current block satisfies the enable condition of the enhanced filtering mode, determine a refined pixel value of the reference pixel point based on the filtered pixel value of the reference pixel point and the original pixel value of reference pixel point.

In some embodiments, the processing module, when determining the refined pixel value of the reference pixel point based on the filtered pixel value of the reference pixel point and the original pixel value of reference pixel point, is specifically configured to: based on the filtered pixel value of the reference pixel point, the original pixel value of the reference pixel point, a third filtering threshold, a fourth filtering threshold, a third filtering offset value and a fourth filtering offset value, determine the refined pixel value of the reference pixel point, where the third filtering threshold and the fourth filtering threshold are opposite numbers to each other.

The systems, devices, modules or units described in the above embodiments may be implemented by computer chips or entities, or by products with certain functions. A typical implementation device is a computer, and the computer, in particular form, may be a personal computer, a laptop computer, a cellular phone, a camera phone, a smart phone, a personal digital assistant, a media player, a navigation equipment, an electronic mail transceiver, a game console, a tablet computer, wearable device, or combinations of any several devices of these devices. For the convenience of description, the above-mentioned apparatus, when described, is divided into various units by function for descriptions. Of course, when the present disclosure is implemented, the functions of each unit can be implemented in one or more software and/or hardware.

Those skilled in the art should understand that the embodiments of the present disclosure may be provided as methods, systems, or computer program products. Therefore, the present disclosure may take the form of a pure hardware embodiment, a pure software embodiment, or an embodiment combining software and hardware. Furthermore, the embodiments of the present disclosure may take the form of a computer program product implemented on one or more computer available storage mediums (including but not limited to disk memories, CD-ROM, optical memories, etc.) containing computer available program codes.

The present disclosure is described with reference to the flowcharts and/or block diagrams of the methods, devices (systems), and computer program products disclosed in the embodiments of the present disclosure. It should be understood that each flow and/or block in the flowcharts and/or block diagrams and combinations of flows and/or blocks in the flowcharts and/or block diagrams may be implemented by computer program instructions. These computer program instructions may be provided to a processor of a general-purpose computer, a special-purpose computer, an embedded processor, or other programmable data processing equipment to produce a machine, so that the instructions executed by the processor or other programmable data processing device generate an apparatus for implementing the functions specified in one or more flows in the flowchart and/or in one or more blocks in the block diagram.

These computer program instructions may also be stored in a computer readable memory capable of directing a computer or another programmable data processing device to operate in a particular manner, so that the instructions stored in the computer readable memory generate a manufactured product including an instruction device, where the instruction device implements the functions specified in one or more flows in the flowchart and/or one or more blocks in the block diagram. These computer program instructions can also be loaded onto a computer or another programmable data processing device, so that a series of operating steps may be performed on the computer or another programmable device to generate computer-implemented processing, and thus instructions executed on the computer or another programmable device provide steps for implementing the function specified in one or more flows in the flowchart and/or one or more blocks in the block diagram. The above descriptions are only some examples of the present disclosure, and are not used to limit the present disclosure. For those skilled in the art, the present disclosure may have various changes and modifications. Any modifications, equivalent replacements, improvements, etc. made within the spirit and principle of this present disclosure shall fall within the scope of claims of the present disclosure.

The invention claimed is:

1. A decoding method, comprising:
   in response to determining that a current pixel point in a current block satisfies an enable condition of an enhanced refinement mode, determining a gradient value of the current pixel point based on an original pixel value of the current pixel point and an original pixel value of a surrounding pixel point of the current pixel point;
   based on the gradient value of the current pixel point and the original pixel value of the current pixel point, determining a refined pixel value of the current pixel point;
   wherein based on the gradient value of the current pixel point and the original pixel value of the current pixel point, determining the refined pixel value of the current pixel point comprises:
      based on the gradient value of the current pixel point, the original pixel value of the current pixel point, a first refinement threshold, a second refinement threshold, a first refinement offset value and a second refinement offset value, determining the refined pixel value of the current pixel point; wherein
         in response to determining that the gradient value of the current pixel point is greater than the first refinement threshold, the refined pixel value of the current pixel point is determined based on the original pixel value of the current pixel point and the first refinement offset value;
         in response to determining that the gradient value of the current pixel point is less than the second refinement threshold, the refined pixel value of the current pixel point is determined based on the original pixel value of the current pixel point and the second refinement offset value.

2. The method of claim 1, wherein in response to determining that the current pixel point in the current block satisfies the enable condition of the enhanced refinement mode, the method further comprises:
   determining a reference pixel point corresponding to the current pixel point from a neighboring block of the current block, and based on an original pixel value of the reference pixel point and an original pixel value of a surrounding pixel point of the reference pixel point, determining a gradient value of the reference pixel point;
   based on the gradient value of the reference pixel point and the original pixel value of the reference pixel point, determining a refined pixel value of the reference pixel point.

3. The method of claim 2, wherein based on the gradient value of the reference pixel point and the original pixel value of the reference pixel point, determining the refined pixel value of the reference pixel point comprises:
   based on the gradient value of the reference pixel point, the original pixel value of the reference pixel point, a third refinement threshold, a fourth refinement threshold, a third refinement offset value and a fourth refinement offset value, determining the refined pixel value of the reference pixel point.

4. The method of claim 3, wherein based on the gradient value of the reference pixel point, the original pixel value of the reference pixel point, a third refinement threshold, a fourth refinement threshold, a third refinement offset value and a fourth refinement offset value, determining the refined pixel value of the reference pixel point comprises:
   in response to determining that the gradient value of the reference pixel point is greater than the third refinement threshold, determining the refined pixel value of the reference pixel point based on the original pixel value of the reference pixel point and the third refinement offset value;
   in response to determining that the gradient value of the reference pixel point is less than the fourth refinement threshold, determining the refined pixel value of the reference pixel point based on the original pixel value of the reference pixel point and the fourth refinement offset value.

5. The method of claim 1, further comprising:
   determining the first refinement threshold, the first refinement offset value, the second refinement offset value, the third refinement threshold, the third refinement offset value and the fourth refinement offset value corresponding to the current block from a high-level syntax.

6. The method of claim 1, wherein before determining that the current pixel point in the current block satisfies the enable condition of the enhanced refinement mode, the method further comprises:
   in response to determining that an enhanced refinement mode enable flag corresponding the current block allows the current block to enable the enhanced refinement mode, determining whether the current pixel point in the current block satisfies the enable condition of the enhanced refinement mode.

7. The method of claim 6, further comprising:
   determining the enhanced refinement mode enable flag corresponding to the current block from a high-level syntax.

8. The method of claim 1, further comprising:
   in response to determining that the current pixel point satisfies an enable condition of a general filtering mode, performing deblocking filtering on the original pixel value of the current pixel point to obtain a filtered pixel value of the current pixel point;

in response to determining that the current pixel point satisfies an enable condition of an enhanced filtering mode, determining the refined pixel value of the current pixel point based on the filtered pixel value of the current pixel point and the original pixel value of the current pixel point.

9. The method of claim 8, wherein determining the refined pixel value of the current pixel point based on the filtered pixel value of the current pixel point and the original pixel value of the current pixel point comprises:

based on the filtered pixel value of the current pixel point, the original pixel value of the current pixel point, a first filtering threshold, a second filtering threshold, a first filtering offset value and a second filtering offset value, determining the refined pixel value of the current pixel point, wherein the first filtering threshold and the second filtering threshold are opposite numbers to each other.

10. The method of claim 8, wherein
in response to determining that the current pixel point satisfies the enable condition of the general filtering mode, the method further comprises:
determining a reference pixel point corresponding to the current pixel point from a neighboring block of the current block, and
performing deblocking filtering on an original pixel value of the reference pixel point to obtain a filtered pixel value of the reference pixel point;
in response to determining that the current pixel point satisfies the enable condition of the enhanced filtering mode, the method further comprises:
determining a refined pixel value of the reference pixel point based on the filtered pixel value of the reference pixel point and the original pixel value of the reference pixel point.

11. The method of claim 10, wherein determining the refined pixel value of the reference pixel point based on the filtered pixel value of the reference pixel point and the original pixel value of the reference pixel point comprises:
based on the filtered pixel value of the reference pixel point, the original pixel value of the reference pixel point, a third filtering threshold, a fourth filtering threshold, a third filtering offset value, and a fourth filtering offset value, determining a refined pixel value of the reference pixel point, wherein the third filtering threshold and the fourth filtering threshold are opposite numbers to each other.

12. The method of claim 9, further comprising:
determining the first filtering threshold, the first filtering offset value, the second filtering offset value, the third filtering threshold, the third filtering offset value and the fourth filtering offset value corresponding to the current block from a high-level syntax.

13. The method of claim 8, wherein determining that the current pixel point in the current block satisfies the enable condition of the enhanced filtering mode comprises:
in response to determining that a boundary strength of a to-be-filtered boundary corresponding to the current pixel point in the current block satisfies the enable condition of the enhanced filtering mode and an absolute value of a difference between the filtered pixel value of the current pixel point and the original pixel value of the current pixel point is greater than a predetermined threshold, determining that the current pixel point satisfies the enable condition of the enhanced filtering mode.

14. The method of claim 13, wherein determining that a boundary strength of a to-be-filtered boundary corresponding to the current pixel point satisfies the enable condition of the enhanced filtering mode comprises:
in response to determining that the boundary strength of the to-be-filtered boundary corresponding to the current pixel point is a predetermined second value, determining that the boundary strength of the to-be-filtered boundary satisfies the enable condition of the enhanced filtering mode.

15. The method of claim 1, further comprising:
in response to determining that an enhanced filtering mode enable flag corresponding to the current block allows the current block to enable the enhanced filtering mode, determining whether the current pixel point satisfies the enable condition of the enhanced filtering mode.

16. The method of claim 1, wherein the pixel value of the current pixel point in the current block is a luma component or a chroma component.

17. An encoding method, comprising:
in response to determining that a current pixel point in a current block satisfies an enable condition of an enhanced refinement mode, determining a gradient value of the current pixel point based on an original pixel value of the current pixel point and an original pixel value of a surrounding pixel point of the current pixel point;
based on the gradient value of the current pixel point and the original pixel value of the current pixel point, determining a refined pixel value of the current pixel point;
wherein based on the gradient value of the current pixel point and the original pixel value of the current pixel point, determining the refined pixel value of the current pixel point comprises:
based on the gradient value of the current pixel point, the original pixel value of the current pixel point, a first refinement threshold, a second refinement threshold, a first refinement offset value and a second refinement offset value, determining the refined pixel value of the current pixel point; wherein
in response to determining that the gradient value of the current pixel point is greater than the first refinement threshold, the refined pixel value of the current pixel point is determined based on the original pixel value of the current pixel point and the first refinement offset value;
in response to determining that the gradient value of the current pixel point is less than the second refinement threshold, the refined pixel value of the current pixel point is determined based on the original pixel value of the current pixel point and the second refinement offset value.

18. A decoder device, comprising a processor and a machine-readable storage medium, wherein the machine-readable storage medium stores machine executable instructions executable by the processor;
the processor is configured to execute the machine executable instructions to perform following operations comprising:
in response to determining that a current pixel point in a current block satisfies an enable condition of an enhanced refinement mode, determining a gradient value of the current pixel point based on an original pixel value of the current pixel point and an original pixel value of a surrounding pixel point of the current pixel point;

based on the gradient value of the current pixel point and the original pixel value of the current pixel point, determining a refined pixel value of the current pixel point;

wherein based on the gradient value of the current pixel point and the original pixel value of the current pixel point, determining the refined pixel value of the current pixel point comprises:

based on the gradient value of the current pixel point, the original pixel value of the current pixel point, a first refinement threshold, a second refinement threshold, a first refinement offset value and a second refinement offset value, determining the refined pixel value of the current pixel point; wherein in response to determining that the gradient value of the current pixel point is greater than the first refinement threshold, the refined pixel value of the current pixel point is determined based on the original pixel value of the current pixel point and the first refinement offset value;

in response to determining that the gradient value of the current pixel point is less than the second refinement threshold, the refined pixel value of the current pixel point is determined based on the original pixel value of the current pixel point and the second refinement offset value.

19. An encoder device, comprising a processor and a machine-readable storage medium, wherein the machine-readable storage medium stores machine executable instructions executable by the processor;

the processor is configured to execute the machine executable instructions to perform the method of claim 17.

* * * * *